US012142174B2

(12) United States Patent
Lee et al.

(10) Patent No.: US 12,142,174 B2
(45) Date of Patent: Nov. 12, 2024

(54) DISPLAY DEVICE INCLUDING A TEST PIXEL

(71) Applicant: Samsung Display Co., LTD., Yongin-si (KR)

(72) Inventors: Seongjoo Lee, Yongin-si (KR); Joon-Chul Goh, Yongin-si (KR); Ohjo Kwon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/230,539

(22) Filed: Aug. 4, 2023

(65) Prior Publication Data

US 2024/0127728 A1 Apr. 18, 2024

(30) Foreign Application Priority Data

Oct. 18, 2022 (KR) ........................ 10-2022-0133987

(51) Int. Cl.
*G09G 3/00* (2006.01)
*G09G 3/20* (2006.01)
*G09G 3/3233* (2016.01)

(52) U.S. Cl.
CPC ........... *G09G 3/006* (2013.01); *G09G 3/2096* (2013.01); *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/0233* (2013.01); *G09G 2320/045* (2013.01); *G09G 2330/08* (2013.01); *G09G 2330/10* (2013.01); *G09G 2330/12* (2013.01)

(58) Field of Classification Search
CPC .... G09G 3/006; G09G 3/2096; G09G 3/3233; G09G 2300/0819; G09G 2300/0852; G09G 2300/0861; G09G 2310/08; G09G 2320/0233; G09G 2320/045; G09G 2330/08; G09G 2330/10; G09G 2330/12
See application file for complete search history.

(56) References Cited

U.S. PATENT DOCUMENTS

2016/0140897 A1* 5/2016 Park .................... G09G 3/3233 345/77
2016/0372029 A1* 12/2016 Park .................... G09G 3/3233
2019/0147781 A1* 5/2019 Park .................... G09G 3/2007 345/691
2019/0259325 A1* 8/2019 Chaji .................... G06T 7/90
2019/0355309 A1* 11/2019 Miwa .................... G09G 3/3233

FOREIGN PATENT DOCUMENTS

KR 20130024744 A 3/2013
KR 101362155 B1 2/2014
KR 20190024364 A 3/2019

* cited by examiner

*Primary Examiner* — Antonio Xavier
(74) *Attorney, Agent, or Firm* — CANTOR COLBURN LLP

(57) ABSTRACT

A display device includes: a display panel including a normal pixel in a display region and a test pixel in a peripheral region, a sensing line coupled to the test pixel, and a sensing circuit configured to sense a mobility characteristic of the test pixel by measuring a current at a source node of the test pixel through the sensing line. The source node of the test pixel is electrically separated from the sensing line in a data writing period of a frame period, and is electrically coupled to the sensing line in an emission period of the frame period.

22 Claims, 15 Drawing Sheets

IP

CP

WP

DISPLAY DEVICE INCLUDING A TEST PIXEL

This application claims priority to Korean Patent Application No. 10-2022-0133987, filed on Oct. 18, 2022, and all the benefits accruing therefrom under 35 U.S.C. § 119, the content of which in its entirety is herein incorporated by reference.

BACKGROUND

1. Field

Embodiments of the present invention relate to a display device, and more particularly to a display device including a test pixel.

2. Description of the Related Art

In a display device, such as an organic light emitting diode ("OLED") display device, each pixel includes a scan transistor that transfers a data voltage, a storage capacitor that stores the data voltage transferred by the scan transistor, a driving transistor that generates a driving current based on the data voltage stored in the storage capacitor, and a light emitting element that emits light based on the driving current generated by the driving transistor.

Even if pixels of the display device are manufactured by the same process, driving transistors of the pixels may have different threshold voltages. To compensate for the threshold voltage of the driving transistor, each pixel may perform an internal compensation operation that stores the threshold voltage of the driving transistor in the storage capacitor. However, even if each pixel performs the internal compensation operation, a change in a mobility characteristic of the driving transistor of each pixel may not be compensated.

SUMMARY

Some embodiments provide a display device capable of sensing a mobility characteristic of a driving transistor by using a test pixel.

According to embodiments, there is provided a display device including a display panel including a normal pixel in a display region and a test pixel in a peripheral region, a sensing line coupled to the test pixel, and a sensing circuit configured to sense a mobility characteristic of the test pixel by measuring a current at a source node of the test pixel through the sensing line. The source node of the test pixel is electrically separated from the sensing line in a data writing period of a frame period, and is electrically coupled to the sensing line in an emission period of the frame period.

In embodiments, the normal pixel may include a light emitting element, and the test circuit may include a diode connection transistor instead of the light emitting element.

In embodiments, the normal pixel may include its own source node different from the source node of the test pixel, and each of the normal pixel and the test pixel may include a first transistor including a top gate coupled to a gate node, a drain, a source coupled to the source node, and a bottom gate, a second transistor configured to apply a data voltage to the gate node in response to a writing signal, a third transistor configured to apply a reference voltage to the gate node in response to a reference signal, a fourth transistor configured to apply an initialization voltage to the source node in response to an initialization signal, a fifth transistor configured to couple a first power supply voltage line to the drain of the first transistor in response to an emission signal, a storage capacitor including a first electrode coupled to the gate node, and a second electrode coupled to the source node, and a holding capacitor including a first electrode coupled to the first power supply voltage line, and a second electrode coupled to the source node and the bottom gate of the first transistor. The normal pixel may further include a light emitting element including an anode coupled to the source node, and a cathode coupled to a second power supply voltage line. The test pixel may further include at least one diode connection transistor coupled between the source node and a third power supply voltage line, and a sixth transistor configured to couple the source node to the sensing line in response to a sensing signal.

In embodiments, a third power supply voltage of the third power supply voltage line may have a voltage level substantially the same as a voltage level of a second power supply voltage of the second power supply voltage line in a non-emission period including the data writing period, and may have a voltage level substantially the same as a voltage level of a first power supply voltage of the first power supply voltage line in the emission period.

In embodiments, the at least one diode connection transistor may include a top gate coupled to the source node, a drain coupled to the source node, and a source coupled to the third power supply voltage line.

In embodiments, the at least one diode connection transistor may further include a bottom gate for receiving a bottom gate voltage.

In embodiments, the sixth transistor may include a gate for receiving the sensing signal, a drain coupled to the source node, and a source coupled to the sensing line.

In embodiments, the first through sixth transistors may be implemented with n-type metal oxide semiconductor ("NMOS") transistors.

In embodiments, the frame period may include an initialization period in which the gate node and the source node are initialized, a compensation period in which a threshold voltage of the first transistor is compensated, the data writing period in which the data voltage is written to the gate node, and the emission period in which the light emitting element of the normal pixel emits light, and the mobility characteristic of the first transistor of the test pixel is sensed.

In embodiments, in the initialization period, the emission signal, the writing signal and the sensing signal may have a low level, the initialization signal and the reference signal may have a high level, the third transistor may be turned on in response to the reference signal having the high level to apply the reference voltage to the gate node, and the fourth transistor may be turned on in response to the initialization signal having the high level to apply the initialization voltage to the source node.

In embodiments, in the compensation period, the initialization signal, the writing signal and the sensing signal may have a low level, the emission signal and the reference signal may have a high level, the third transistor may be turned on in response to the reference signal having the high level to apply the reference voltage to the gate node, the fifth transistor may be turned on in response to the emission signal having the high level, and a voltage of the source node may be saturated to a voltage corresponding to a value obtained by subtracting the threshold voltage from the reference voltage.

In embodiments, in the data writing period, the emission signal, the initialization signal, the reference signal and the sensing signal may have a low level, the writing signal may have a high level, the second transistor may be turned on in response to the writing signal having the high level to apply the data voltage to the gate node, and the sixth transistor of the test pixel may be turned off in response to the sensing signal having the low level to electrically separate the source node of the test pixel from the sensing line.

In embodiments, in the emission period, the initialization signal, the reference signal and the writing signal may have a low level, the emission signal and the sensing signal may have a high level, in the normal pixel, the light emitting element may emit light based on a current generated by the first transistor, and, in the test pixel, the sixth transistor may be turned on in response to the sensing signal having the high level to electrically couple the source node to the sensing line such that a current generated by the first transistor is transferred to the sensing line through the source node and the sixth transistor.

In embodiments, the normal pixel may include its own source node different from the source node of the test pixel, and each of the normal pixel and the test pixel may include a first transistor including a top gate coupled to a gate node, a drain, a source coupled to the source node, and a bottom gate, a second transistor configured to apply a data voltage to the gate node in response to a writing signal, a third transistor configured to apply a reference voltage to the gate node in response to a reference signal, a fourth transistor including a gate for receiving an initialization signal, a drain coupled to the source node, and a source for receiving an initialization voltage, a fifth transistor configured to couple a first power supply voltage line to the drain of the first transistor in response to an emission signal, a storage capacitor including a first electrode coupled to the gate node, and a second electrode coupled to the source node, and a holding capacitor including a first electrode coupled to the first power supply voltage line, and a second electrode coupled to the source node and the bottom gate of the first transistor. The normal pixel may further include a light emitting element including an anode coupled to the source node, and a cathode coupled to a second power supply voltage line. The test pixel may further include at least one diode connection transistor coupled between the source node and a third power supply voltage line. The sensing line may be coupled to the source of the fourth transistor of the test pixel.

In embodiments, in the data writing period, the emission signal, the initialization signal and the reference signal may have a low level, the writing signal may have a high level, the second transistor may be turned on in response to the writing signal having the high level to apply the data voltage to the gate node, and the fourth transistor of the test pixel may be turned off in response to the initialization signal having the low level to electrically separate the source node of the test pixel from the sensing line.

In embodiments, in the emission period, the reference signal and the writing signal may have a low level, the emission signal may have a high level, the initialization signal for the normal pixel may have the low level, the initialization signal for the test pixel may have the high level, in the normal pixel, the light emitting element may emit light based on a current generated by the first transistor, and, in the test pixel, the fourth transistor may be turned on in response to the initialization signal having the high level to electrically couple the source node to the sensing line such that a current generated by the first transistor is transferred to the sensing line through the source node and the fourth transistor.

In embodiments, the sensing circuit may include an integrator configured to generate an output voltage by integrating a current transferred through the sensing line, and an analog-to-digital converter configured to generate sensing data by performing an analog-to-digital conversion operation on the output voltage of the integrator.

In embodiments, the integrator may include an amplifier including a first input terminal, a second input terminal, and an output terminal for outputting the output voltage, a first switch configured to couple the sensing line to the first input terminal of the amplifier in response to a sensing signal, a second switch configured to couple the first input terminal of the amplifier to the output terminal of the amplifier in response to a reset signal, and a capacitor coupled between the first input terminal of the amplifier and the output terminal of the amplifier.

In embodiments, the display device may further include a data driver configured to provide data voltages to the normal pixel and the test pixel, a scan driver configured to provide scan signals to the normal pixel and the test pixel, an emission driver configured to provide emission signals to the normal pixel and the test pixel, and a controller configured to control the data driver, the scan driver and the emission driver. The controller may receive sensing data representing the mobility characteristic of the test pixel from the sensing circuit, and may correct image data for the normal pixel based on the sensing data.

According to embodiments, there is provided a display device including a display panel including a normal pixel in a display region and a test pixel in a peripheral region, a sensing line coupled to the test pixel, and a sensing circuit configured to sense a mobility characteristic of the test pixel through the sensing line. Each of the normal pixel and the test pixel includes a first transistor including a top gate coupled to a gate node, a drain, a source coupled to a source node, and a bottom gate, a second transistor configured to apply a data voltage to the gate node in response to a writing signal, a third transistor configured to apply a reference voltage to the gate node in response to a reference signal, a fourth transistor configured to apply an initialization voltage to the source node in response to an initialization signal, a fifth transistor configured to couple a first power supply voltage line to the drain of the first transistor in response to an emission signal, a storage capacitor including a first electrode coupled to the gate node, and a second electrode coupled to the source node, and a holding capacitor including a first electrode coupled to the first power supply voltage line, and a second electrode coupled to the source node and the bottom gate of the first transistor. The normal pixel further includes a light emitting element including an anode coupled to the source node, and a cathode coupled to a second power supply voltage line. The test pixel further includes at least one diode connection transistor coupled between the source node and a third power supply voltage line, and a sixth transistor configured to couple the source node to the sensing line in response to a sensing signal.

In embodiments, in a data writing period of a frame period, the sixth transistor of the test pixel may be turned off in response to the sensing signal having a low level to electrically separate the source node of the test pixel from the sensing line. In an emission period of the frame period, the sixth transistor of the test pixel may be turned on in response to the sensing signal having a high level to electrically couple the source node to the sensing line such that a current generated by the first transistor of the test pixel is transferred to the sensing line through the source node of the test pixel and the sixth transistor of the test pixel.

According to embodiments, there is provided a display device including a display panel including a normal pixel in a display region and a test pixel in a peripheral region, a sensing line coupled to the test pixel, and a sensing circuit configured to sense a mobility characteristic of the test pixel through the sensing line. Each of the normal pixel and the test pixel includes a first transistor including a top gate coupled to a gate node, a drain, a source coupled to a source node, and a bottom gate, a second transistor configured to apply a data voltage to the gate node in response to a writing signal, a third transistor configured to apply a reference voltage to the gate node in response to a reference signal, a fourth transistor including a gate for receiving an initialization signal, a drain coupled to the source node, and a source for receiving an initialization voltage, a fifth transistor configured to couple a first power supply voltage line to the drain of the first transistor in response to an emission signal, a storage capacitor including a first electrode coupled to the gate node, and a second electrode coupled to the source node, and a holding capacitor including a first electrode coupled to the first power supply voltage line, and a second electrode coupled to the source node and the bottom gate of the first transistor. The normal pixel further includes a light emitting element including an anode coupled to the source node, and a cathode coupled to a second power supply voltage line. The test pixel further includes at least one diode connection transistor coupled between the source node and a third power supply voltage line. The sensing line is coupled to the source of the fourth transistor of the test pixel.

In embodiments, in a data writing period of a frame period, the fourth transistor of the test pixel may be turned off in response to the initialization signal having a low level to electrically separate the source node of the test pixel from the sensing line. In an emission period of the frame period, the fourth transistor of the test pixel may be turned on in response to the initialization signal having a high level to electrically couple the source node to the sensing line such that a current generated by the first transistor of the test pixel is transferred to the sensing line through the source node of the test pixel and the fourth transistor of the test pixel.

As described above, in a display device according to embodiments, a display panel may include a test pixel coupled to a sensing line in a peripheral region, and a sensing circuit may sense a mobility characteristic of the test pixel by measuring a current at a source node of the test pixel through the sensing line. Accordingly, image data for a normal pixel may be corrected based on the mobility characteristic sensed using the test pixel, and thus a change in the mobility characteristic may be compensated.

Further, in the display device according to embodiments, the source node of the test pixel may be electrically separated from the sensing line in a data writing period, and may be electrically coupled to the sensing line in an emission period. Accordingly, a sensing data voltage of the test pixel may not be distorted by a parasitic capacitor of the sensing line.

BRIEF DESCRIPTION OF THE DRAWINGS

Illustrative, non-limiting embodiments will be more clearly understood from the following detailed description in conjunction with the accompanying drawings.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"Substantially the same as", "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Hereinafter, embodiments of the present invention will be explained in detail with reference to the accompanying drawings.

Figure 1:
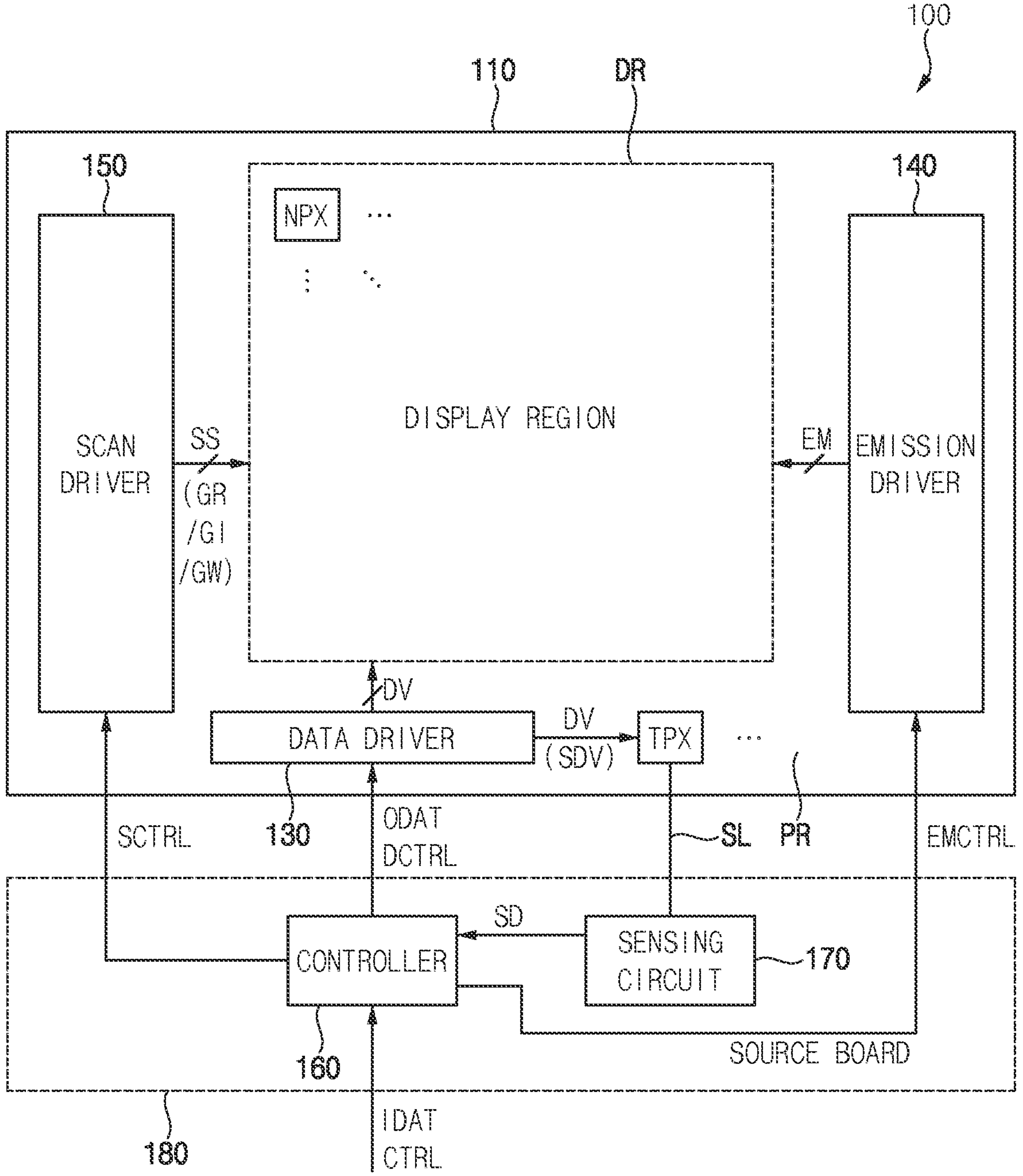
FIG. 1 is a block diagram illustrating a display device according to embodiments.
Figure 2:
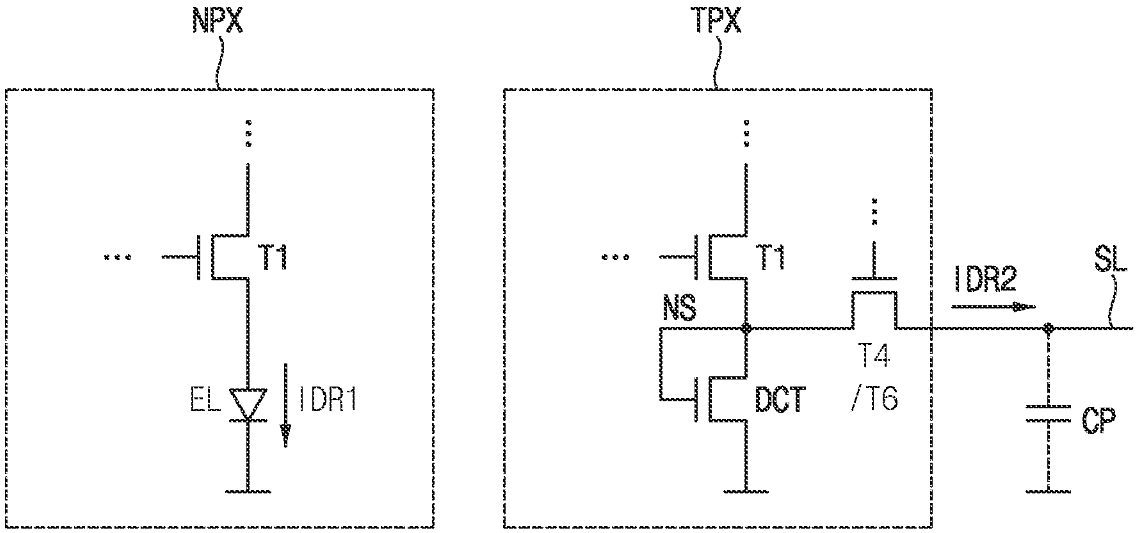
FIG. 2 is a circuit diagram illustrating an example of a portion of a normal pixel and a portion of a test pixel included in a display device according to embodiments.
Figure 3:
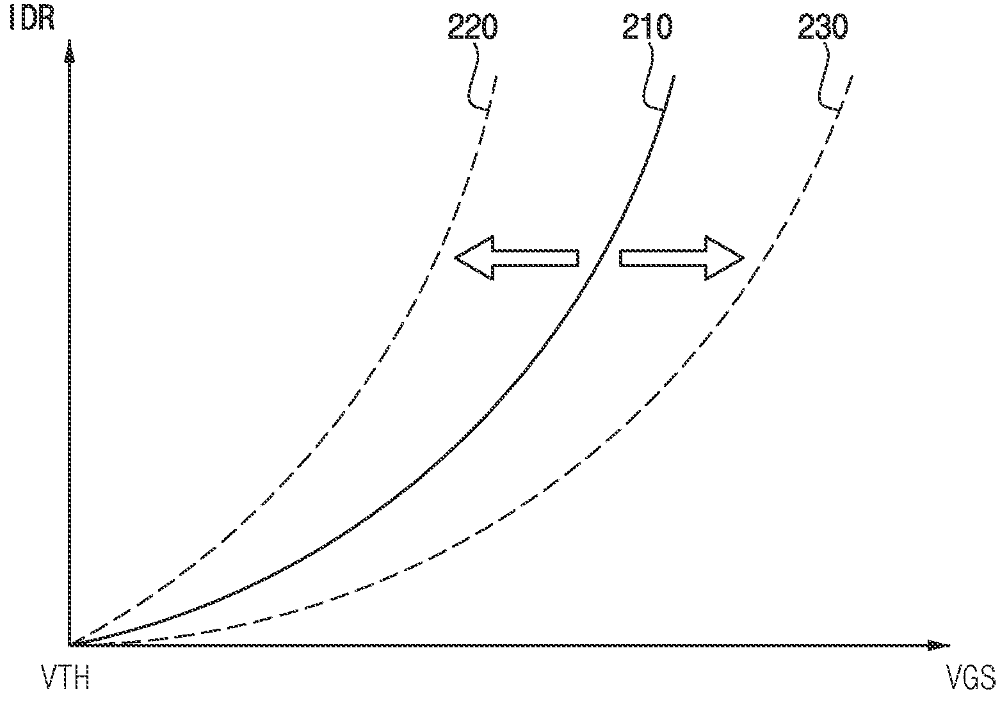
FIG. 3 is a diagram for describing a change of a mobility characteristic of a pixel included in a display device according to embodiments.

FIG. 1 is a block diagram illustrating a display device according to embodiments, FIG. 2 is a circuit diagram illustrating an example of a portion of a normal pixel and a portion of a test pixel included in a display device according to embodiments, and FIG. 3 is a diagram for describing a change of a mobility characteristic of a pixel included in a display device according to embodiments.

Referring to FIG. 1, a display device 100 according to embodiments may include a display panel 110 including a normal pixel NPX and a test pixel TPX, a sensing line SL coupled to the test pixel TPX, and a sensing circuit 170 sensing a mobility characteristic of the test pixel TPX through the sensing line SL. In some embodiments, the display device 100 may further include a data driver 130 providing data voltages DV to the normal pixel NPX and the test pixel TPX, a scan driver 150 providing scan signals SC to the normal pixel NPX and the test pixel TPX, an emission driver 140 providing emission signals EM to the normal pixel NPX and the test pixel TPX, and a controller 160 controlling the data driver 130, the scan driver 150 and the emission driver 140.

The display panel 110 may have a display region DR at which an image is displayed, and a peripheral region PR adjacent to the display region DR. The display panel 110 may include a plurality of normal pixels NPX arranged in a matrix form having a plurality of rows and a plurality of columns in the display region DR, and may further include at least one test pixel TPX in the peripheral region PR. For example, the display panel 110 may include, but not limited to, one, two, four, eight, twelve or sixteen test pixels TPX in the peripheral region.

In some embodiments, as illustrated in FIG. 2, each normal pixel NPX may include a light emitting element EL. For example, the light emitting element EL may be an organic light emitting diode (OLED), and the display panel 110 may be an OLED display panel. In other examples, the light emitting device EL may be a nano light emitting diode ("NED"), a quantum dot ("QD") light emitting diode, a micro light emitting diode, an inorganic light emitting diode, or any other suitable light emitting element. Further, as illustrated in FIG. 2, each test pixel TPX may be coupled to a corresponding sensing line SL, and may include a diode connection transistor DCT instead of the light emitting element EL. The diode connection transistor DCT may simulate or mimic the light emitting element EL. For example, a drain and a gate of the diode connection transistor DCT may be coupled to each other, and the diode connection transistor DCT may have a threshold voltage corresponding to (or substantially the same as) a threshold voltage of the light emitting element EL.

The display panel 110 may include one or more sensing lines SL coupled to one or more test pixels TPX, respectively. For example, when the display panel 110 includes sixteen test pixels TPX, the display panel 110 may include sixteen sensing lines SL coupled to the sixteen test pixels TPX, respectively. Further, as illustrated in FIG. 2, each sensing line SL may have a parasitic capacitor CP by a source board 180 or an adjacent wiring.

The sensing circuit 170 may sense the mobility characteristic of the test pixel TPX by measuring a current IDR2 at a source node NS of the test pixel TPX through the sensing line SL. For example, the sensing circuit 170 may sense the mobility characteristic of a first transistor T1 (or a driving transistor) of the test pixel TPX by measuring the current IDR2 generated by the first transistor T1 of the test pixel TPX through the sensing line SL. In some embodiments, the sensing circuit 170 may be implemented as an integrated circuit, and the integrated circuit of the sensing circuit 170 may be mounted on the source board 180. For example, this integrated circuit of the sensing circuit 170 may be referred to as a read-out integrated circuit ("ROIC"). In other embodiments, the sensing circuit 170 may be implemented as a single integrated circuit together with the data driver 130 and/or the controller 160.

The data driver 130 may generate data voltages DV based on output image data ODAT and a data control signal DCTRL received from the controller 160, and may provide the data voltages DV to the normal pixels NPX through first data lines. Further, the data driver 130 may provide, as the data voltage DV, a sensing data voltage SDV corresponding to a sensing gray level to the test pixel TPX through a second data line DL2. In some embodiments, the sensing gray level may be a predetermined constant gray level, or a variable gray level that is changed at regular intervals. For example, the sensing gray level may be, but not be limited to, a 0-gray level, a 57-gray level, a 255-gray level, etc. Further, in some embodiments, the second data line for the test pixel TPX may be different from the first data lines for the normal pixels NPX. In other embodiments, the second data line may be a portion of the first data lines. In some embodiments, the data driver 130 may be implemented as one or more integrated circuits. Further, in some embodiments, as illustrated in FIG. 1, the integrated circuit of the data driver 130 may be mounted on the peripheral region PR of the display panel 110, but the location of the integrated circuit of the data driver 130 is not limited to the example of FIG. 1. In other embodiments, the data driver 130 and controller 160 may be implemented as a single integrated circuit, and this integrated circuit may be referred to as a timing controller embedded data driver ("TED") integrated circuit.

The scan driver 150 may generate the scan signals SC based on a scan control signal SCTRL received from the controller 160, and may provide the scan signals SC to the normal pixels NPX and the one or more test pixels TPX. In some embodiments, the scan driver 150 may sequentially provide the scan signals SC to the normal pixels NPX and the one or more test pixels TPX on a pixel row basis through a plurality of scan lines. For example, the display panel 110 may include the normal pixels NPX in N rows and the one or more test pixels TPX in one row, where N is an integer greater than 1, and may further include first through N-th scan lines (or first through N-th scan line sets) coupled to the N rows of the normal pixels NPX, respectively, and an (N+1)-th scan line (or an (N+1)-th scan line set) coupled to the one row of the test pixels TPX. In this case, the scan driver 150 may sequentially provide the scan signals SS to the N rows of the normal pixels NPX on the pixel row basis through the first through N-th scan lines, and then (e.g., after one horizontal time from a time point at which the scan signal SS is output to the N-th scan line) may provide the scan signal SS to the test pixels TPX through the (N+1)-th scan line. However, the order in which the scan signal SS is applied to the test pixels TPX is not limited to the above example. Further, in some embodiments, the scan signal SS may include, but not limited to, a reference signal GR, an initialization signal GI and a writing signal GW. In some embodiments, the scan control signal SCTRL may include, but not limited to, a scan start signal and a scan clock signal. In some embodiments, as illustrated in FIG. 1, the scan driver 150 may be integrated or formed in the peripheral region PR of the display panel 110. In other embodiments, the scan driver 150 may be implemented as one or more integrated circuits.

The emission driver 140 may generate the emission signals EM based on an emission control signal EMCTRL received from the controller 160, and may provide the emission signals EM to the normal pixels NPX and the one or more test pixels TPX. In some embodiments, the emission driver 140 may sequentially provide the emission signals EM to the normal pixels NPX and the one or more test pixels TPX on a pixel row basis through a plurality of emission lines. For example, the display panel 110 may include the normal pixels NPX in N rows and the one or more test pixels TPX in one row, and may further include first through N-th emission lines coupled to the N rows of the normal pixels NPX, respectively, and an (N+1)-th emission line coupled to the one row of the test pixels TPX. In this case, the emission driver 140 may sequentially provide the emission signals EM to the N rows of the normal pixels NPX on the pixel row basis through the first through N-th emission lines, and then (e.g., after one horizontal time from a time point at which the emission signal EM is output to the N-th emission line) may provide the emission signal EM to the test pixels TPX through the (N+1)-th emission line. However, the order in which the emission signal EM is applied to the test pixels TPX is not limited to the above example. Further, in some embodiments, the emission control signal EMCTRL may include, but not limited to, an emission start signal and an emission clock signal. In some embodiments, as illustrated in FIG. 1, the emission driver 140 may be integrated or formed in the peripheral region PR of the display panel 110. In other embodiments, the emission driver 140 may be implemented as one or more integrated circuits.

The controller 160 (e.g., a timing controller ("TCON")) may receive input image data IDAT and a control signal CTRL from an external host processor (e.g., a graphics processing unit ("GPU"), an application processor ("AP") or a graphics card). In some embodiments, the control signal CTRL may include, but not limited to, a vertical synchronization signal, a horizontal synchronization signal, an input data enable signal, a master clock signal, etc. Further, in some embodiments, the controller 160 may receive sensing data SD representing the mobility characteristic of the test pixel TPX from the sensing circuit 170, and may generate the output image data ODAT by correcting the input image data IDAT for the normal pixels NPX based on the sensing data SD. Thus, by using the mobility characteristic of the first transistor T1 (or the driving transistor) of the test pixel TPX, the data voltage DV where the mobility characteristic of the first transistor T1 (or the driving transistor) is compensated may be provided to the normal pixel NPX. Further, the controller 160 may generate the data control signal DCTRL, the scan control signal SCTRL and the emission control signal EMCTRL based on the control signal CTRL.

The controller 160 may control an operation of the data driver 130 by providing the output image data ODAT and the data control signal DCTRL to the data driver 130, may control an operation of the scan driver 150 by providing the scan control signal SCTRL to the scan driver 150, and may control an operation of the emission driver 140 by providing the emission control signal EMCTRL to the emission driver 140.

In the display device 100 according to embodiments, each normal pixel NPX may perform a compensation operation or an internal compensation operation that stores a threshold voltage of the first transistor T1 (or the driving transistor) in a storage capacitor CST (See FIG. 4) of the normal pixel NPX. Accordingly, even if the first transistors T1 of the normal pixels NPX have different threshold voltages, the normal pixels NPX may have uniform luminance regardless of the threshold voltages of the first transistors T1. However, although the internal compensation operation is performed, if the mobility characteristic of the first transistor T1 is changed, the normal pixel NPX may not emit light with desired luminance. For example, as illustrated in FIG. 3, although the internal compensation operation is performed, if the mobility of the first transistor T1 is changed from an initial mobility 210 to an increased mobility 220, the current IDS of the first transistor T1 corresponding to the same gate-source voltage VGS may be increased, and the light emitting element EL may emit light with luminance higher than the desired luminance. Further, although the internal compensation operation is performed, if the mobility of the first transistor T1 is changed from the initial mobility 210 to a decreased mobility 230, the current IDS of the first transistor T1 corresponding to the same gate-source voltage VGS may be decreased, and the light emitting element EL may emit light with luminance lower than the desired luminance.

To compensate for this change in the mobility characteristic of the first transistor T1, in the display device 100 according to embodiments, the sensing circuit 170 may generate the sensing data SD representing the mobility characteristic of the first transistor T1 by measuring the current IDR2 at the source node NS of the test pixel TPX, or the current IDR2 of the first transistor T1 of the test pixel TPX through the sensing line SL, the controller 160 may generate the output image data ODAT by correcting the input image data IDAT based on the sensing data SD, and the data driver 130 may provide the data voltages DV corresponding to the output image data ODAT to the normal pixels NPX. That is, the data voltage DV where the mobility characteristic of the first transistor T1 (or the driving transistor) is compensated may be provided to the normal pixel NPX, and the normal pixel NPX may emit light with the desired luminance. However, when the sensing data voltage SDV is written to the test pixel TPX, the sensing data voltage SDV may be distorted by the parasitic capacitor CP of the sensing line SL, the current IDR2 of the first transistor T1 of the test pixel TPX may be distorted based on the distorted sensing data voltage SDV, and thus the sensing data SD may be inaccurate.

In order to prevent the distortion of the sensing data voltage SDV of the test pixel TPX caused by the parasitic capacitor CP of the sensing line SL, in the display device 100 according to embodiments, the source node NS of the test pixel TPX may be electrically separated or spaced apart from the sensing line SL in a data writing period of a frame period. In some embodiment, a sixth transistor T6 of the test pixel TPX may electrically separate the source node NS from the sensing line SL in the data writing period in response to a sensing signal. In other embodiments, a fourth transistor T4 (or an initialization transistor) of the test pixel TPX may electrically separate the source node NS from the sensing line SL in the data writing period in response to an initialization signal. Further, in an emission period of the frame period, the light emitting element EL of the normal pixel NPX may emit light based on the current IDR1 of the first transistor T1, the current IDR2 generated by the first transistor T1 of the test pixel TPX may be transferred to the sensing line SL through the source node NS and the fourth or sixth transistor T4/T6, and the sensing circuit 170 may generate the sensing data SD by measuring the current IDR2 of the first transistor T1 of the test pixel TPX through the sensing line SL. Since the source node NS of the test pixel TPX is electrically separated from the sensing line SL in the data writing period, the sensing data voltage SDV may not be distorted, the current IDR2 of the first transistor of the test pixel TPX may not be distorted, accurate sensing data SD may be generated, and the mobility characteristic change of the first transistor T1 may be accurately compensated.

As described above, in the display device 100 according to embodiments, the display panel 110 may include the test pixel TPX coupled to the sensing line SL in the peripheral region PR, and the sensing circuit 170 may sense the mobility characteristic of the test pixel TPX by measuring the current IDR2 at the source node NS of the test pixel TPX through the sensing line SL. Accordingly, image data (or the input image data IDAT) for the normal pixel NPX may be corrected based on the mobility characteristic sensed using the test pixel TPX, and thus the mobility characteristic change may be compensated. Further, the source node NS of the test pixel TPX may be electrically separated from the sensing line SL in the data writing period, and may be electrically coupled to the sensing line SL in the emission period. Accordingly, the sensing data voltage SDV of the test pixel TPX may not be distorted by the parasitic capacitor CP of the sensing line SL, and the mobility characteristic change of the first transistor T1 may be accurately compensated.

Figure 4:
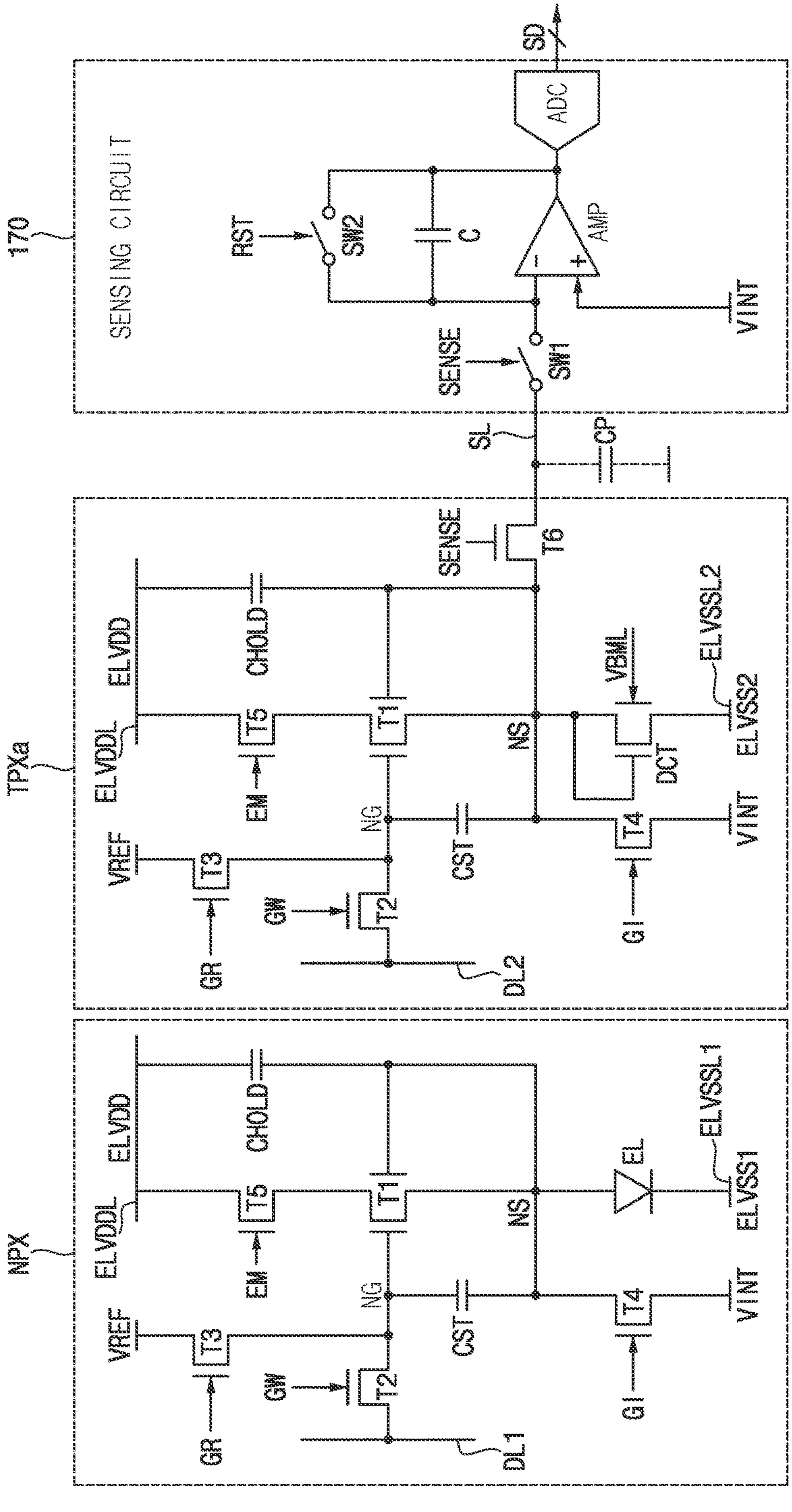
FIG. 4 is a circuit diagram illustrating an example of a normal pixel and a test pixel included in a display device according to embodiments.
Figure 5:
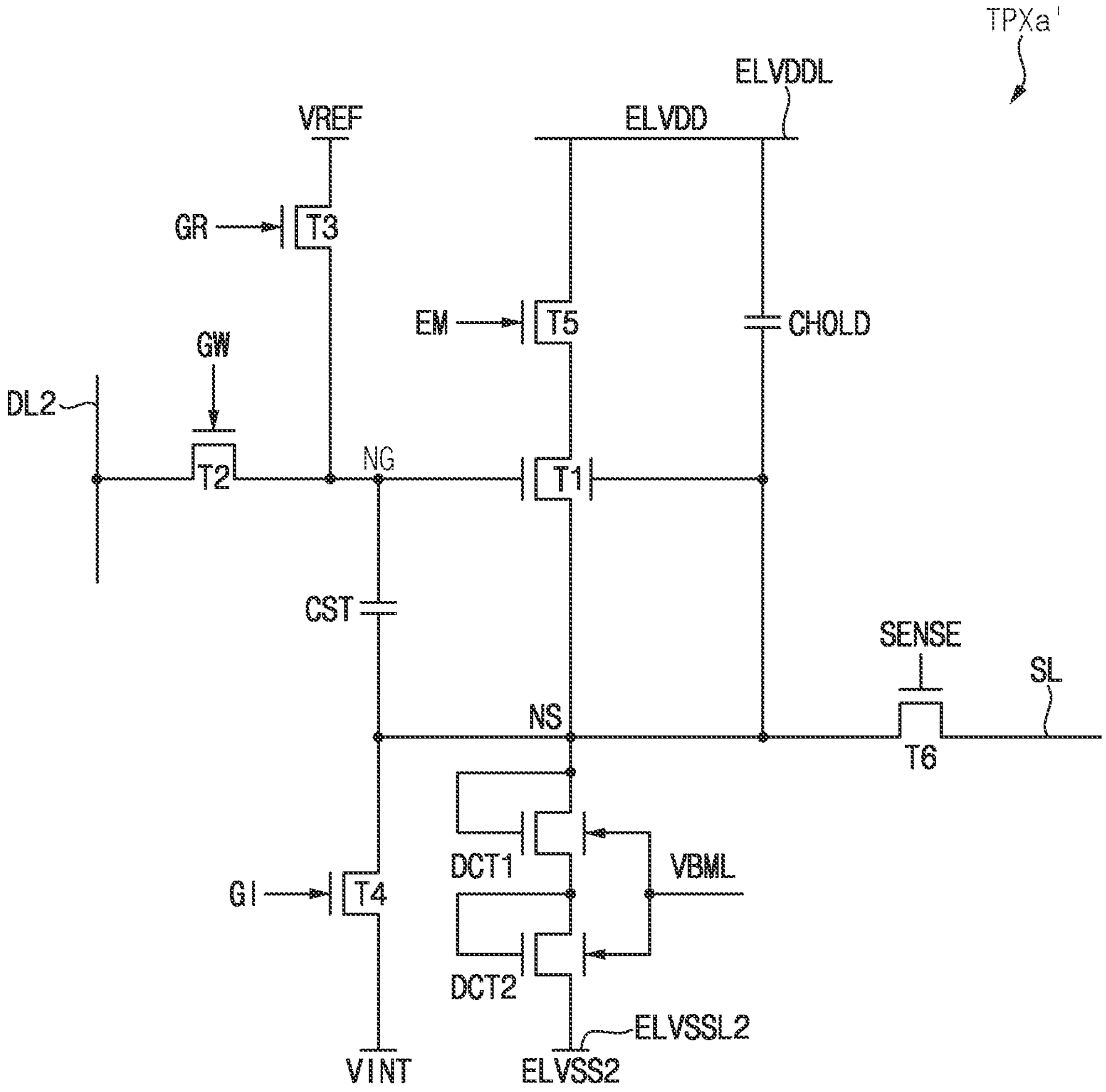
FIG. 5 is a circuit diagram illustrating another example of a test pixel included in a display device according to embodiments.

FIG. 4 is a circuit diagram illustrating an example of a normal pixel and a test pixel included in a display device according to embodiments, and FIG. 5 is a circuit diagram illustrating another example of a test pixel included in a display device according to embodiments.

Referring to FIG. 4, each of a normal pixel NPX and a test pixel TPXa may include a first transistor T1, a second transistor T2, a third transistor T3, a fourth transistor T4, a fifth transistor T5, a storage capacitor CST and a holding capacitor CHOLD. The normal pixel NPX located in a display region may further include a light emitting element EL, and the test pixel TPXa located in a peripheral region may further include at least one diode connection transistor DCT and a sixth transistor T6. Further, a sensing circuit 170 may include an integrator and an analog-to-digital converter ADC.

The first transistor T1 may generate a current (e.g., a driving current) based on a voltage between a gate node NG and a source node NS, or a voltage stored in the storage capacitor CST. The first transistor T1 may be referred to as a driving transistor for generating the driving current. In some embodiments, the first transistor T1 may include a top gate coupled to the gate node NG, a drain coupled to the fifth transistor T5, a source coupled to the source node NS, and a bottom gate coupled to the holding capacitor CHOLD and the source node NS. Thus, the first transistor T1 may have a dual gate structure including the top gate and the bottom gate. In some embodiments, the bottom gate of the first transistor T1 may be referred to as a bottom metal layer. Since the first transistor T1 includes the bottom gate, and the bottom gate may be maintained to have a substantially constant voltage by the holding capacitor CHOLD, a driving characteristic of the first transistor T1 may be improved. For example, a current of the first transistor T1 according to a drain-source voltage of the first transistor T1 may be substantially flat or uniform.

The second transistor T2 may apply a data voltage of a data line DL1 and DL2 to the gate node NG in response to a writing signal GW. For example, the second transistor T2 of the normal pixel NPX may apply the data voltage of a first data line DL1 to the gate node NG in response to the writing signal GW, and the second transistor T2 of the test pixel TPXa may apply the data voltage of a second data line DL2 to the gate node NG in response to the writing signal GW. The second transistor T2 may be referred to as a scan transistor for transferring the data voltage of the data line DL1 and DL2. In some embodiments, the second transistor T2 may include a gate for receiving the writing signal GW, a drain coupled to the data line DL1 and DL2, and a source coupled to the gate node NG.

The third transistor T3 may apply a reference voltage VREF to the gate node NG in response to a reference signal GR. The third transistor T3 may be referred to as a reference transistor or a reset transistor for applying the reference voltage VREF to the gate node NG. In some embodiments, the third transistor T3 may include a gate for receiving the reference signal GR, a drain coupled to a line of the reference voltage VREF, and a source coupled to the gate node NG.

The fourth transistor T4 may apply an initialization voltage VINT to the source node NS in response to an initialization signal GI. The fourth transistor T4 may be referred to as an initialization transistor for initializing the source node NS. In some embodiments, the fourth transistor T4 may include a gate for receiving the initialization signal GI, a drain coupled to the source node NS, and a source coupled to a line of the initialization voltage VINT.

The fifth transistor T5 may couple a first power supply voltage line ELVDDL to the drain of the first transistor T1 in response to an emission signal EM. In some embodiments, the first power supply voltage line ELVDDL may be a high power supply voltage line, and a first power supply voltage ELVDD transferred through the first power supply voltage line ELVDDL may be a high power supply voltage. Further, the fifth transistor T5 may be referred to as an emission transistor for generating a path of the current of the first transistor T1 from the first power supply voltage line ELVDDL. In some embodiments, the fifth transistor T5 may include a gate for receiving the emission signal EM, a drain coupled to the first power supply voltage line ELVDDL, and a source coupled to the drain of the first transistor T1.

The storage capacitor CST may store the data voltage transferred through the second transistor T2 from the data line DL1 and DL2. The storage capacitor CST may be coupled between the gate node NG and the source node NS. In some embodiments, the storage capacitor CST may include a first electrode coupled to the gate node NG, and a second electrode coupled to the source node NS.

The holding capacitor CHOLD may be a capacitor for holding a voltage of the source node NS. The holding capacitor CHOLD may be coupled between the first power supply voltage line ELVDDL and the source node NS (and the bottom gate of the first transistor T1). In some embodiments, the holding capacitor CHOLD may include a first electrode coupled to the first power supply voltage line ELVDDL, and a second electrode coupled to the source node NS and the bottom gate of the first transistor T1.

The light emitting element EL of the normal pixel NPX may emit light based on the current generated by the first transistor T1. In some embodiments, the light emitting element EL may be, but not be limited to, an organic light emitting diode (OLED). In other embodiments, the light emitting element EL may be a nano light emitting diode (NED), a quantum dot (QD) light emitting diode, a micro light emitting diode, an inorganic light emitting diode, or any other suitable light emitting element. In some embodiments, the light emitting element EL may include an anode coupled to the source node NS, and a cathode coupled to a second power supply voltage line ELVSSL1. In some embodiments, the second power supply voltage line ELVSSL1 may be a low power supply voltage line, and a second power supply voltage ELVSS1 transferred through the second power supply voltage line ELVSSL1 may be a low power supply voltage.

The diode connection transistor DCT of the test pixel TPXa may be coupled between the source node NS and a third power supply voltage line ELVSSL2. The diode connection transistor DCT may simulate or mimic the light emitting element EL. For example, the diode connection transistor DCT may have a threshold voltage corresponding to a threshold voltage of the light emitting element EL. In some embodiments, the diode connection transistor DCT may include a top gate coupled to the source node NS, a drain coupled to the source node NS, and a source coupled to the third power supply voltage line ELVSSL2. Further, in some embodiments, the diode connection transistor DCT may have a dual gate structure, and may further include a bottom gate for receiving a bottom gate voltage VBML. Further, a voltage level of the bottom gate voltage VBML may be set such that the diode connection transistor DCT may have the threshold voltage corresponding to the threshold voltage of the light emitting element EL. In some embodiments, a third power supply voltage ELVSS2 of the third power supply voltage line ELVSSL2 may have a voltage level substantially the same as a voltage level of the second power supply voltage ELVSS1 of the second power supply voltage line ELVSSL1 in a non-emission period including a data writing period, and may have a voltage level substantially the same as a voltage level of the first power supply voltage ELVDD of the first power supply voltage line ELVDDL in an emission period. Accordingly, in the emission period, a current at the source node NS of the test pixel TPXa, or the current of the first transistor T1 of the test pixel TPXa may not flow through the diode connection transistor DCT to the third power supply voltage line ELVSSL2.

In some embodiments, as illustrated in FIG. 5, the test pixel TPXa' may include two or more diode connection transistors DCT1 and DCT2 between the source node NS and the third power supply voltage line ELVSSL2. For example, a drain and a gate of each of the two or more diode connection transistors DCT1 and DCT2 may be coupled to each other, and the two or more diode connection transistors DCT1 and DCT2 may be connected in series between the source node NS and the third power supply voltage line ELVSSL2. In this case, a sum of threshold voltages of the two or more diode connection transistors DCT1 and DCT2 may correspond to the threshold voltage of the light emitting element EL. Further, in some embodiments, each of the two or more diode connection transistors DCT1 and DCT2 may include a bottom gate, and the bottom gates of the two or more diode connection transistors DCT1 and DCT2 may receive the bottom gate voltage VBML.

The sixth transistor T6 of the test pixel TPXa may couple the source node NS to the sensing line SL in response to a sensing signal SENSE. In some embodiments, the sensing signal SENSE may be generated by, but not limited to, the sensing circuit 170. In some embodiments, the sixth transistor T6 may be turned off in response to the sensing signal SENSE having a low level to electrically separate the source node NS from the sensing line SL, and may be turned on in response to the sensing signal SENSE having a high level to electrically couple the source node NS to the sensing line SL. Further, in some embodiments, the sixth transistor T6 may include a gate for receiving the sensing signal SENSE, a drain coupled to the source node NS, and a source coupled to the sensing line SL.

In some embodiments, as illustrated in FIG. 4, the first through sixth transistors T1 through T6 of the normal and test pixels NPX and TPXa may be implemented with, but not limited to, n-type metal oxide semiconductor (NMOS) transistors. In other embodiments, a portion or all of the first through sixth transistors T1 through T6 may be implemented with p-type metal oxide semiconductor (PMOS) transistors. Further, in some embodiments, the first through sixth transistors T1 through T6 may be implemented with, but not limited to, oxide transistors.

The integrator of the sensing circuit 170 may generate an output voltage by integrating a current transferred through the sensing line SL, and the analog-to-digital converter ADC of the sensing circuit 170 may generate sensing data SD by performing an analog-to-digital conversion operation on the output voltage of the integrator. In some embodiments, the integrator may include an amplifier AMP, a first switch SW1, a second switch SW2 and a capacitor C.

For example, the amplifier AMP may include a first input terminal (e.g., a negative input terminal), a second input terminal (e.g., a positive input terminal), and an output terminal for outputting the output voltage. In some embodiments, the second input terminal of the amplifier AMP may receive, but not limited to, the initialization voltage VINT. The first switch SW1 may couple the sensing line SL to the first input terminal of the amplifier AMP in response to the sensing signal SENSE. The second switch SW2 may couple the first input terminal of the amplifier AMP to the output terminal of the amplifier AMP in response to a reset signal RST. The capacitor C may be coupled between the first input terminal of the amplifier AMP and the output terminal of the amplifier AMP.

Hereinafter, an example of operations of the normal pixel NPX, the test pixel TPXa and the sensing circuit 170 will be described below with reference to FIGS. 4 and 6 through 12.

Figure 6:
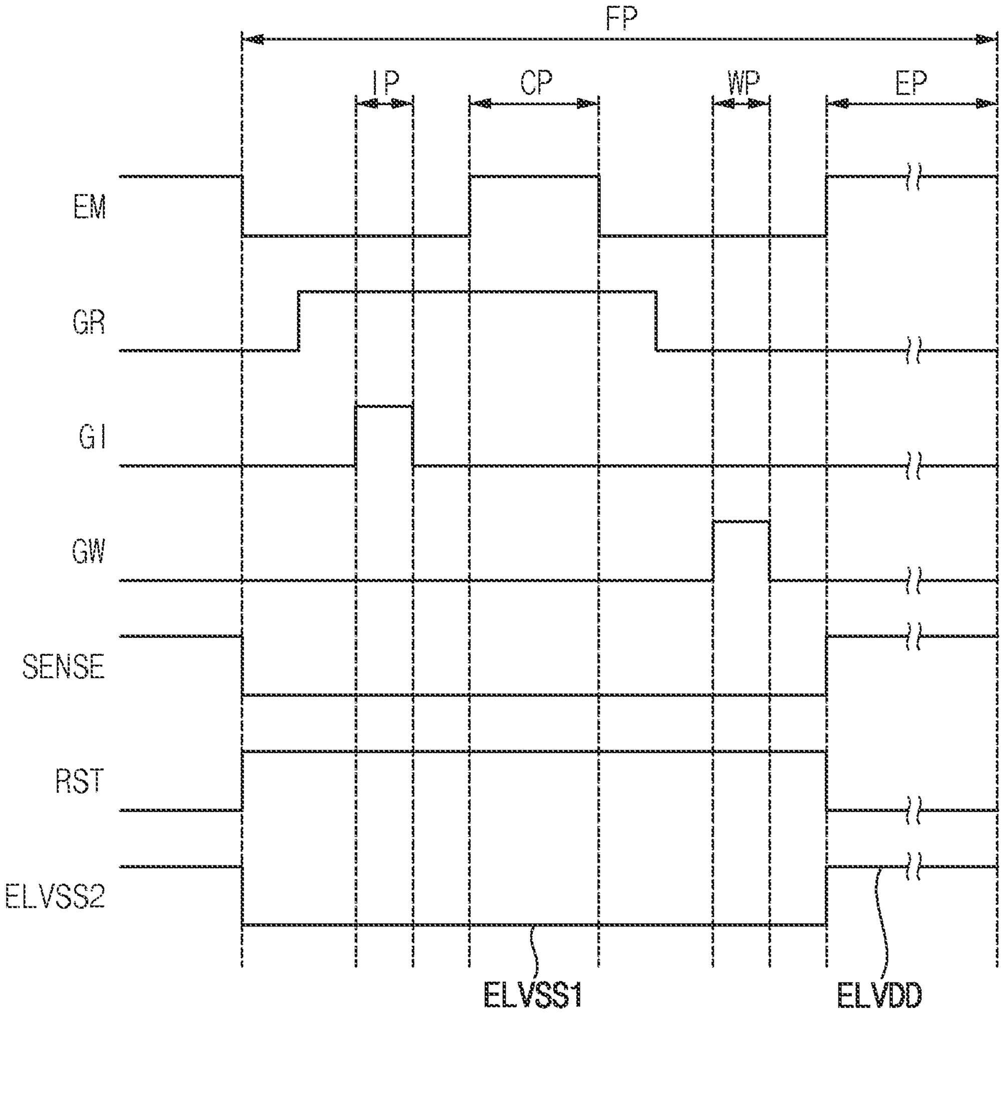
FIG. 6 is a timing diagram for describing an operation of a display device according to embodiments.
Figure 7:
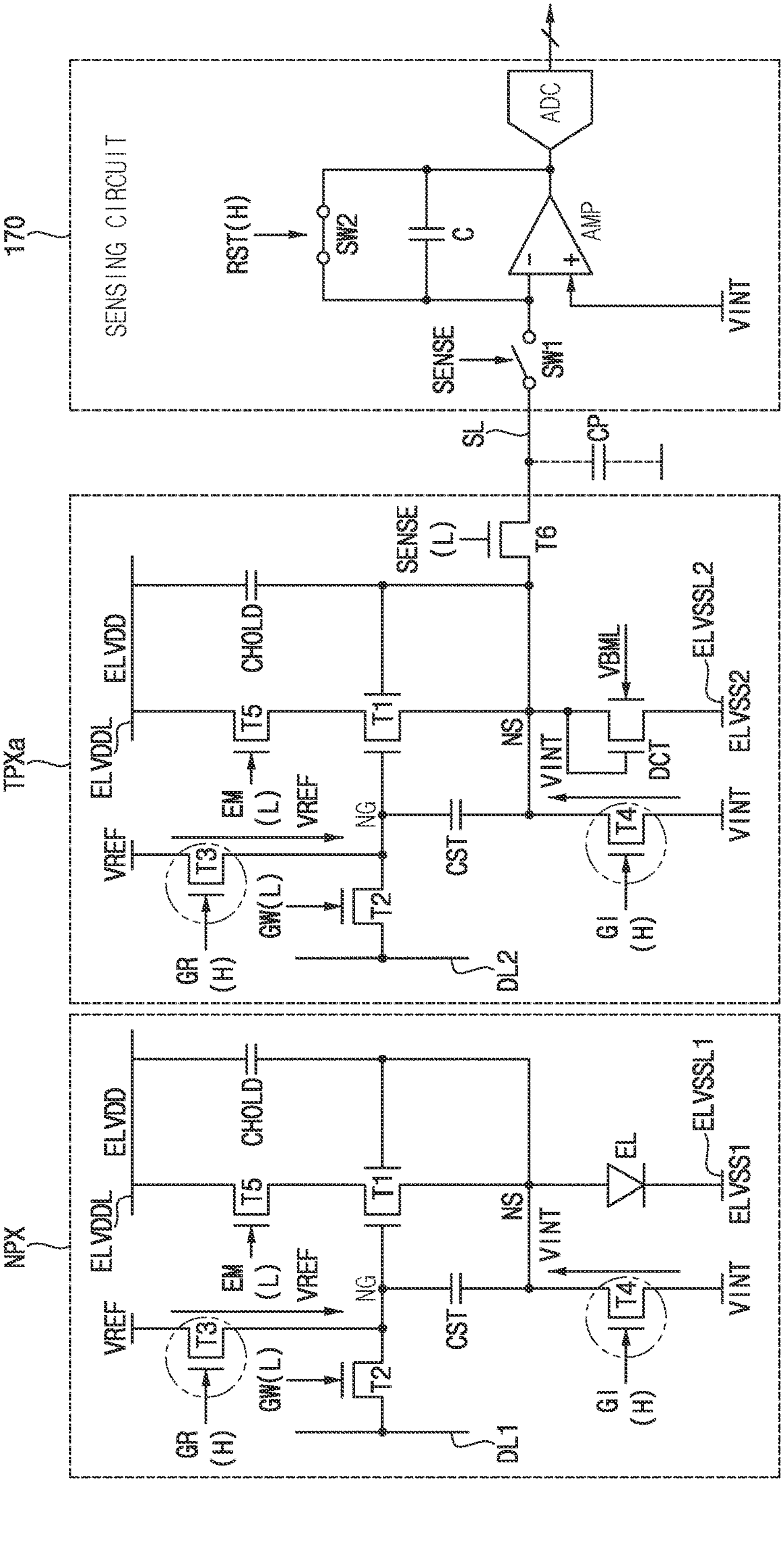
FIG. 7 is a circuit diagram for describing an example of operations of a normal pixel, a test pixel and a sensing circuit in an initialization period.
Figure 8:
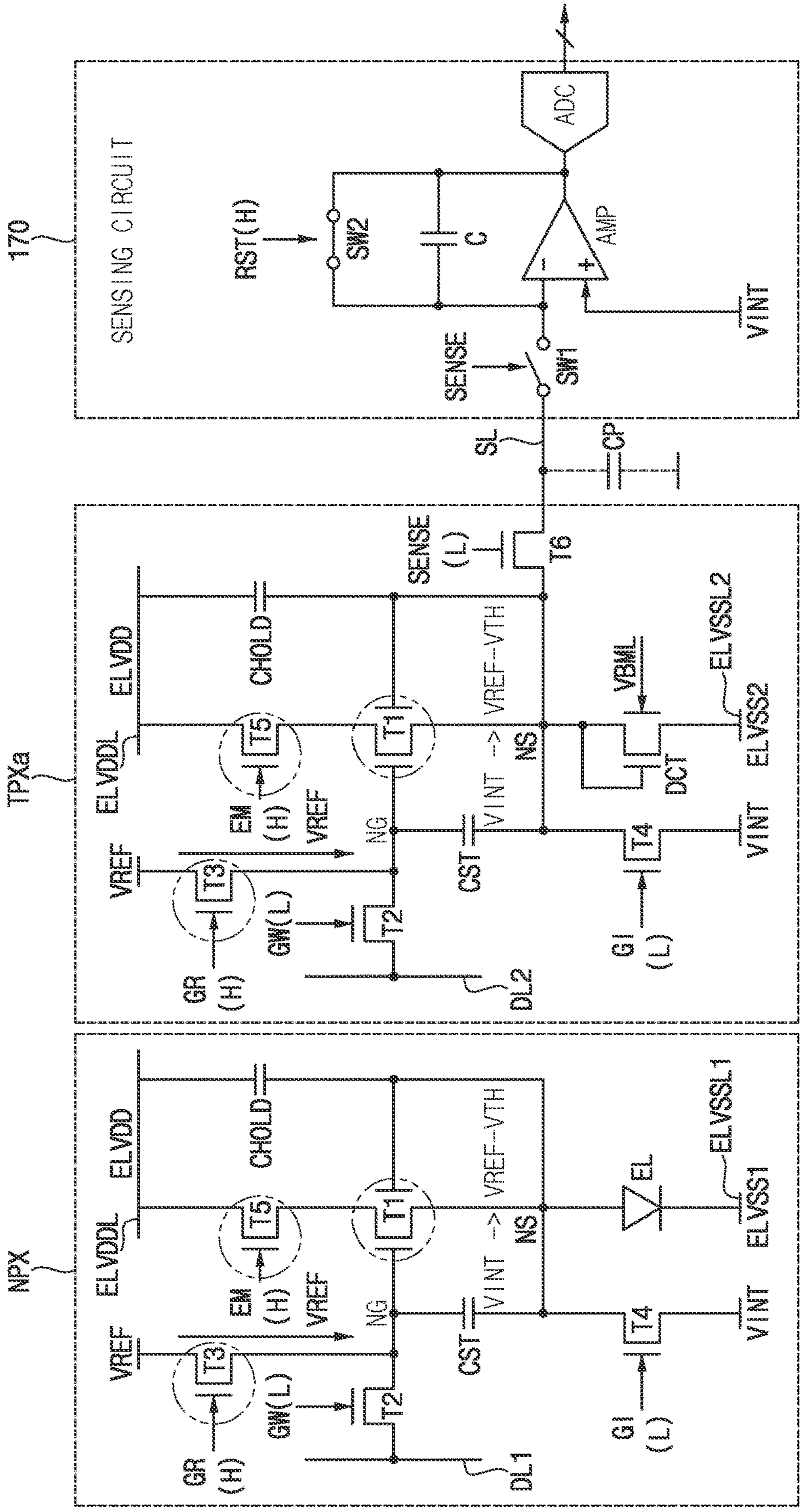
FIG. 8 is a circuit diagram for describing an example of operations of a normal pixel, a test pixel and a sensing circuit in a compensation period.
Figure 9:
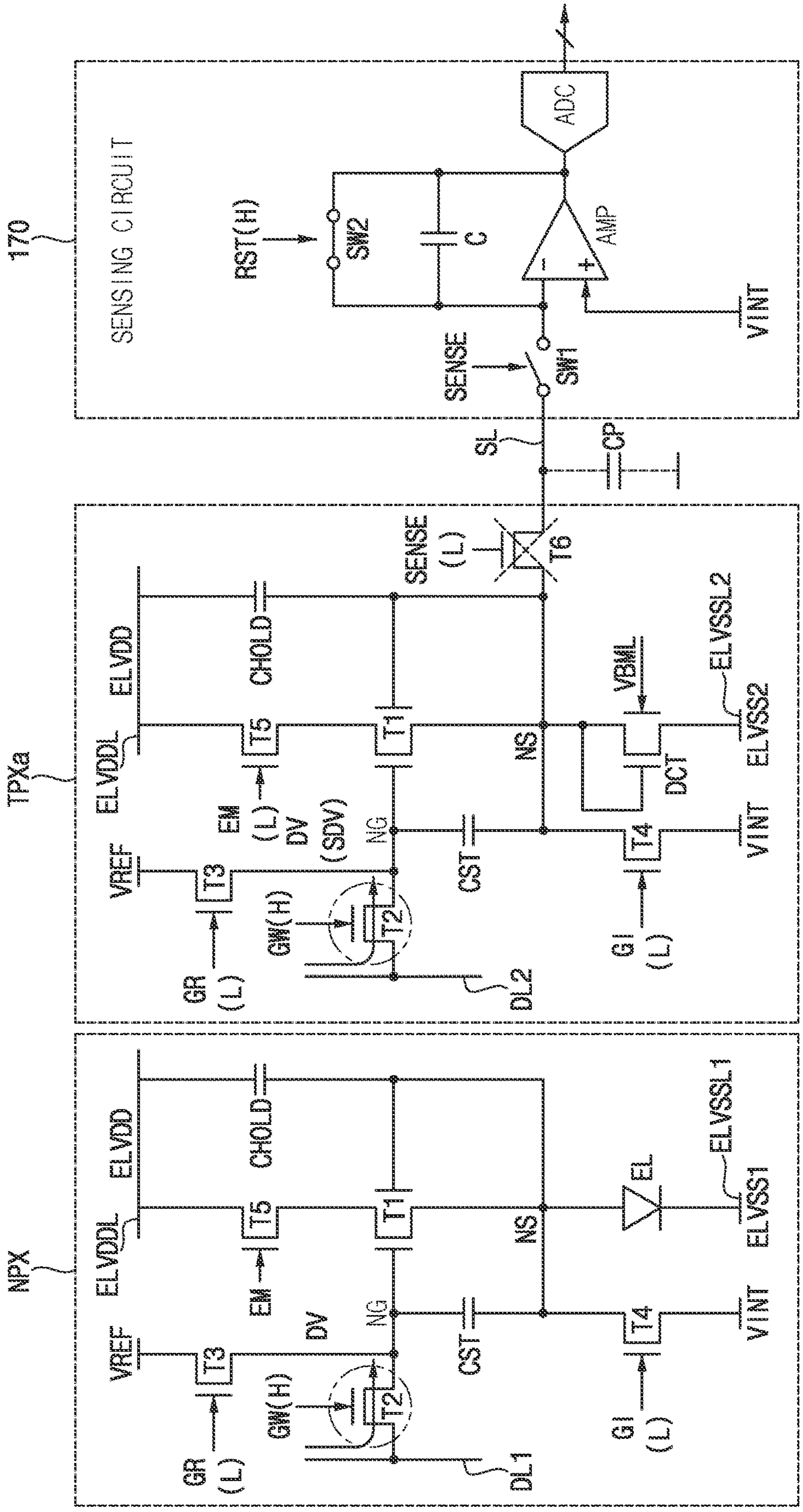
FIG. 9 is a circuit diagram for describing an example of operations of a normal pixel, a test pixel and a sensing circuit in a data writing period.
Figure 11:
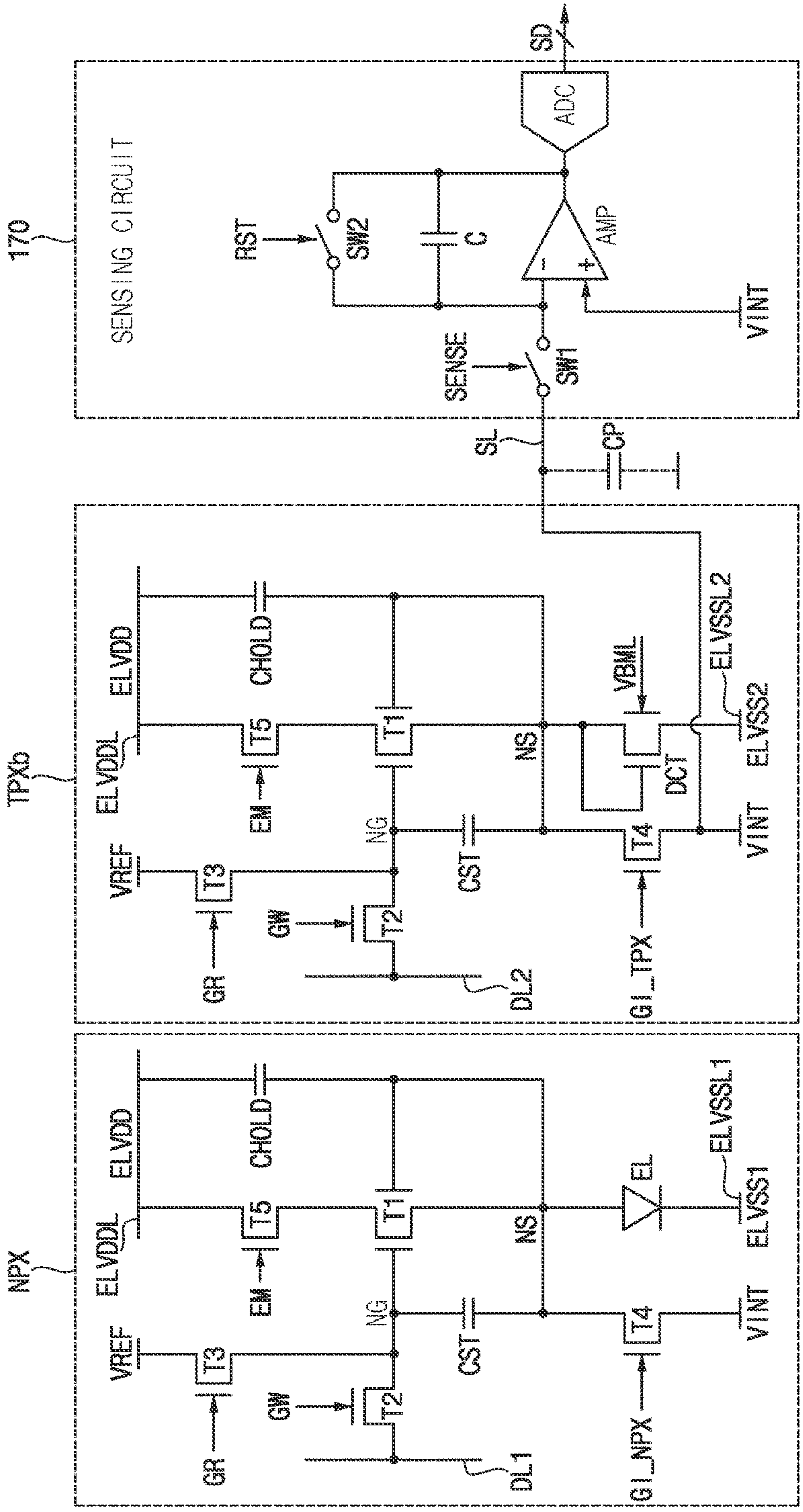
FIG. 11 is a circuit diagram illustrating another example of a normal pixel and a test pixel included in a display device according to embodiments.
Figure 12:
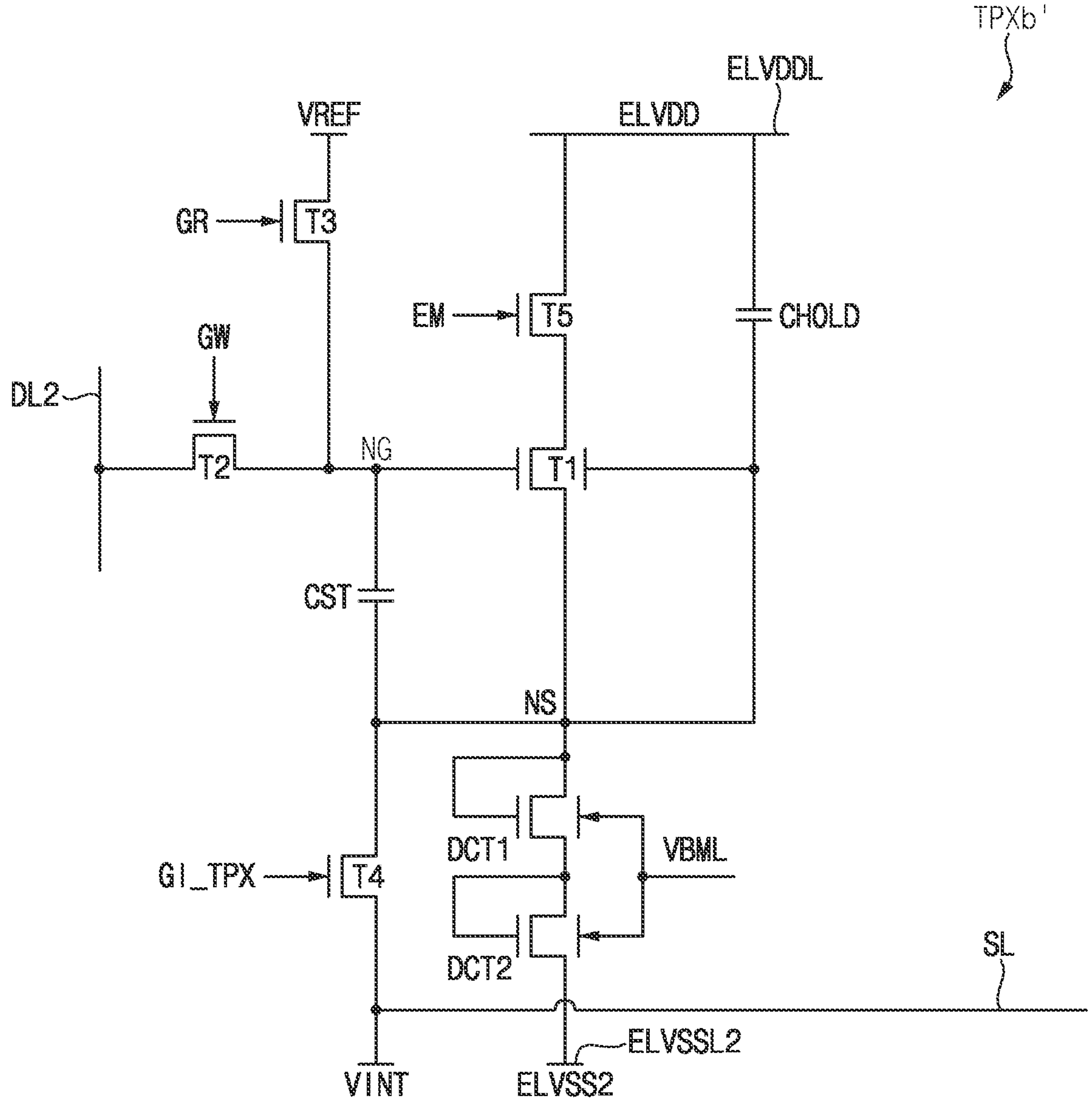
FIG. 12 is a circuit diagram illustrating still another example of a test pixel included in a display device according to embodiments.

FIG. 6 is a timing diagram for describing an operation of a display device according to embodiments, FIG. 7 is a circuit diagram for describing an example of operations of a normal pixel, a test pixel and a sensing circuit in an initialization period, FIG. 8 is a circuit diagram for describing an example of operations of a normal pixel, a test pixel and a sensing circuit in a compensation period, FIG. 9 is a circuit diagram for describing an example of operations of a normal pixel, a test pixel and a sensing circuit in a data writing period, FIG. is a circuit diagram for describing an example of operations of a normal pixel, a test pixel and a sensing circuit in an emission period, FIG. 11 is a circuit diagram illustrating another example of a normal pixel and a test pixel included in a display device according to embodiments, and FIG. 12 is a circuit diagram illustrating still another example of a test pixel included in a display device according to embodiments.

Referring to FIGS. 4 and 6, a frame period FP for each pixel NPX and TPXa may include an initialization period IP, a compensation period CP, a data writing period WP and an emission period EP. In some embodiments, the frame periods FP for respective pixels NPX and TPXa may be sequentially shifted by one horizontal time on a pixel row basis. For example, a display panel 110 may include normal pixels NPX located in first through N-th rows and one or more test pixels TPXa located in an (N+1)-th row, the data writing period WP for the first row of the normal pixels NPX may correspond to a first horizontal time, the data writing period WP for a second row of the normal pixels NPX may correspond to a second horizontal time directly after the first horizontal time, the data writing period WP for the N-th row of the normal pixels NPX may correspond to an N-th horizontal time, and the data writing period WP for the (N+1)-th row of the test pixels TPXa may correspond to an (N+1)-th horizontal time directly after the N-th horizontal time. Further, the initialization period IP, the compensation period CP and the emission period EP also may be sequentially shifted by one horizontal time on a pixel row basis.

In the initialization period IP, the gate node NG and the source node NS may be initialized. As illustrated in FIGS. 6 and 7, in the initialization period IP, the emission signal EM, the writing signal GW and the sensing signal SENSE may have a low level, the initialization signal GI, the reference signal GR and the reset signal RST may have a high level H, and the third power supply voltage ELVSS2 may have a voltage level substantially the same as a voltage level of the second power supply voltage ELVSS1. The third transistor T3 may be turned on in response to the reference signal GR having the high level H to apply the reference voltage VREF to the gate node NG, and the fourth transistor T4 may be turned on in response to the initialization signal GI having the high level H to apply the initialization voltage VINT to the source node NS. Thus, the gate node NG may be initialized based on the reference voltage VREF, and the source node NS may be initialized based on the initialization voltage VINT. Further, the second switch SW2 may couple the first input terminal of the amplifier AMP and the output terminal of the amplifier AMP to each other in response to the reset signal RST having the high level H, and thus the capacitor C coupled between the first input terminal of the amplifier AMP and the output terminal of the amplifier AMP may be discharged or initialized.

In the compensation period CP, a threshold voltage of the first transistor T1 may be compensated. As illustrated in FIGS. 6 and 8, in the compensation period CP, the initialization signal GI, the writing signal GW and the sensing signal SENSE have the low level, the emission signal EM, the reference signal GR and the reset signal RST have the high level H, and the third power supply voltage ELVSS2 may have the voltage level substantially the same as the voltage level of the second power supply voltage ELVSS1. The third transistor T3 may be turned on in response to the reference signal GR having the high level H to apply the reference voltage VREF to the gate node NG, and the fifth transistor T5 may be turned on in response to the emission signal EM having the high level H. If the reference voltage VREF is applied to the gate node NG, or the gate of the first transistor T1, and the fifth transistor T5 is turned on, the first transistor T1 may have an on condition, and may be turned on. Further, the first transistor T1 may be turned on until a voltage of the source node NS becomes a voltage corresponding to the threshold voltage VTH of the first transistor T1 subtracted from the reference voltage VREF. Accordingly, in the compensation period CP, the voltage of the source node NS may be changed from the initialization voltage VINT to "the reference voltage minus the threshold voltage VREF-VTH", or may be saturated to the voltage corresponding to the threshold voltage VTH subtracted from the reference voltage VREF. Thus, the threshold voltage VTH of the first transistor T1 may be stored between both electrodes of the storage capacitor CST. This operations that stores threshold voltage VTH of the first transistor T1 in the storage capacitor CST may be referred to as a compensation operation or an internal compensation operation for compensating for the threshold voltage VTH of the first transistor T1.

In the data writing period WP, the data voltage DV of the data line DL1 and the sensing data voltage SDV of the data line DL2 may be written to the pixel NPX and the pixel TPXa, respectively. As illustrated in FIGS. 6 and 9, in the data writing period WP, the emission signal EM, the initialization signal GI, the reference signal GR and the sensing signal SENSE have the low level L, the writing signal GW and the reset signal RST may have the high level H, and the third power supply voltage ELVSS2 may have the voltage level substantially the same as the voltage level of the second power supply voltage ELVSS1. The second transistor T2 may be turned on in response to the writing signal GW having the high level H to apply the data voltage DV (or the sensing data voltage SDV) of the data line DL1 and DL2 to the gate node NG. For example, the second transistor T2 of the normal pixel NPX may transfer the data voltage DV of a first data line DL1 corresponding to output image data, and the second transistor T2 of the test pixel TPXa may transfer, as the data voltage DV, a sensing data voltage SDV of a second data line DL2 to the gate node NG. Thus, the gate node NG, or the first electrode of the storage capacitor CST may have the data voltage DV (or the sensing data voltage SDV). If a voltage of the gate node NG, or a voltage of the first electrode of the storage capacitor CST is changed by "DV-VREF" from the reference voltage VREF to the data voltage DV, a voltage stored between the first electrode and the second electrode of the storage capacitor CST, or a gate-source voltage of the first transistor T1 may become "(DV-VREF)*CHOLD/(CST+CHOLD)+VTH". Since the gate-source voltage of the first transistor T1 includes the threshold voltage VTH of the first transistor T1, and a current of the first transistor T1 is determined based on the gate-source voltage minus the threshold voltage VTH, the current of the first transistor T1 may be determined regardless of the threshold voltage VTH of the first transistor T1. Further, the sixth transistor T6 of the test pixel TPXa may be turned off in response to the sensing signal SENSE having the low level L to electrically separate the source node NS from the sensing line SL. Accordingly, the voltage stored between the first electrode and the second electrode of the storage capacitor CST of the test pixel TPXa, or the gate-source voltage of the first transistor T1 of the test pixel TPXa may be determined as "(SDV-VREF)*CHOLD/(CST+CHOLD)+VTH", and may not be affected by a parasitic capacitor CP of the sensing line SL.

Figure 10:
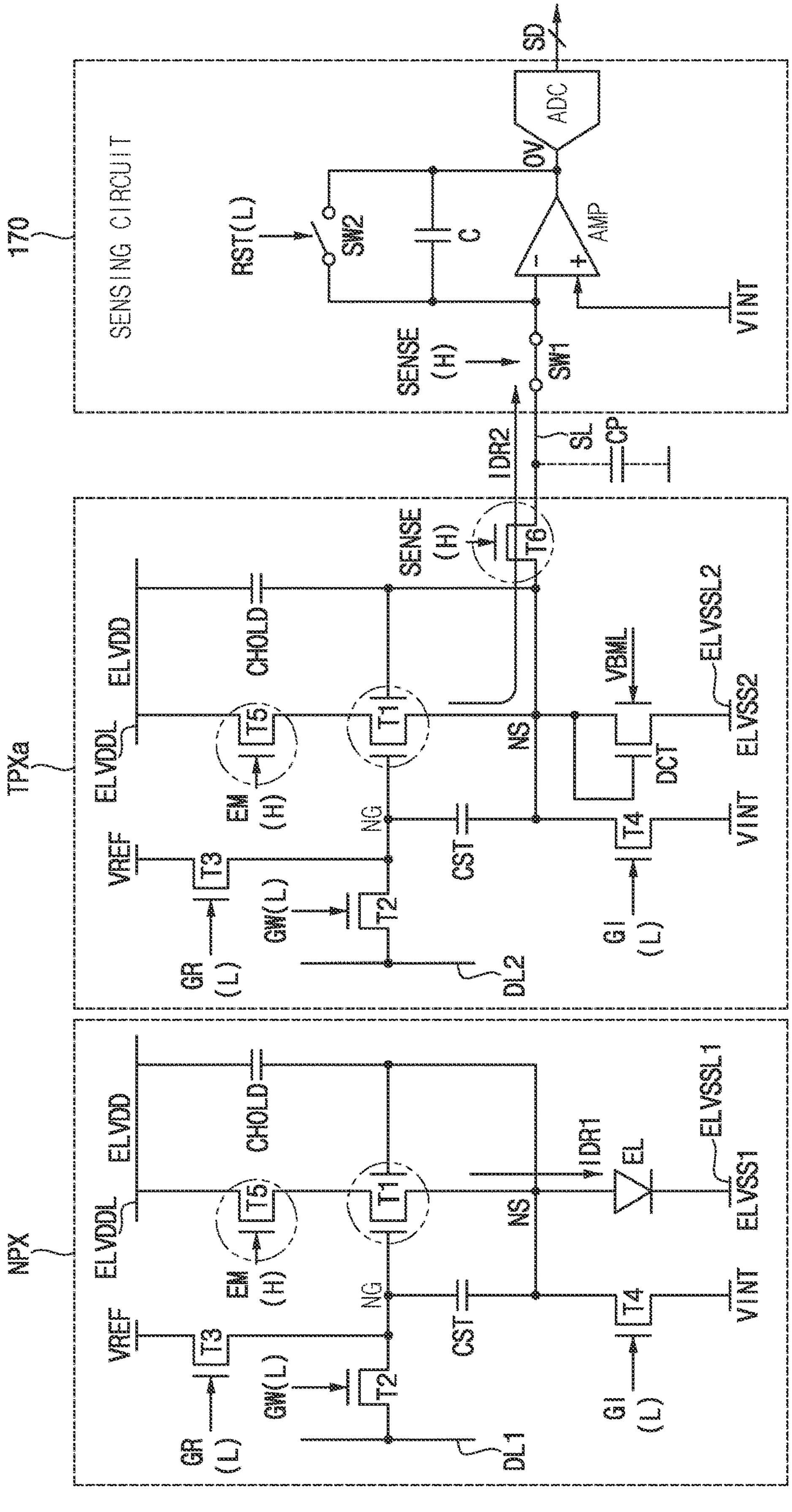
FIG. 10 is a circuit diagram for describing an example of operations of a normal pixel, a test pixel and a sensing circuit in an emission period.

In the emission period EP, the light emitting element EL of the normal pixel NPX may emit light, and a mobility characteristic of the first transistor T1 of the test pixel TPXa may be sensed. As illustrated in FIGS. 6 and 10, in the emission period EP, the initialization signal GI, the reference signal GR, the writing signal GW and the reset signal RST may have the low level, the emission signal EM and the sensing signal SENSE may have the high level H, and the third power supply voltage ELVSS2 may be increased from the second power supply voltage ELVSS1 to the first power supply voltage ELVDD. In the normal pixel NPX, the first transistor T1 may generate a current IDR1 based on the voltage stored in the storage capacitor CST, the fifth transistor T5 may be turned on in response to the emission signal EM having the high level H to form a path of the current IDR1 from the first power supply voltage line ELVDDL to the second power supply voltage line ELVSSL1, and the light emitting element EL may emit light based on the current IDR1 generated by the first transistor T1. In the test pixel TPXa, since the third power supply voltage ELVSS2 has a voltage level substantially the same as a voltage level of the first power supply voltage ELVDD, a current IDR2 at the source node NS of the test pixel TPXa, or the current IDR2 generated by the first transistor T1 may not flow through the diode connection transistor DCT to the third power supply voltage line ELVSSL2. Further, the sixth transistor T6 may be turned on in response to the sensing signal SENSE having the high level H to electrically couple the source node NS to the sensing line SL, and thus the current IDR2 generated by the first transistor T1 may be transferred to the sensing line SL through the source node NS and the sixth transistor T6. The second switch SW2 of the sensing circuit 170 may be turned off in response to the reset signal RST having the low level, and the first switch SW1 of the sensing circuit 170 may couple the sensing line SL to the first input terminal of the amplifier AMP in response to the sensing signal SENSE having the high level H. The integrator of the sensing circuit 170 may generate the output voltage OV by integrating the current IDR2 generated by the first transistor T1, and the analog-to-digital converter ADC of the sensing circuit 170 may generate the sensing data SD corresponding to the output voltage OV.

As described above, the source node NS of the test pixel TPXa may be electrically separated by the sixth transistor T6 from the sensing line SL in the data writing period WP. Accordingly, the sensing data voltage SDV of the test pixel TPXa may not be distorted by the parasitic capacitor CP of the sensing line SL, and the mobility characteristic change of the first transistor T1 may be accurately compensated.

FIG. 11 is a circuit diagram illustrating another example of a normal pixel and a test pixel included in a display device according to embodiments, and FIG. 12 is a circuit diagram illustrating still another example of a test pixel included in a display device according to embodiments.

Referring to FIG. 11, each of a normal pixel NPX and a test pixel TPXb may include a first transistor T1, a second transistor T2, a third transistor T3, a fourth transistor T4, a fifth transistor T5, a storage capacitor CST and a holding capacitor CHOLD. The normal pixel NPX located in a display region DR may further include a light emitting element EL, and the test pixel TPXb located in a peripheral region PR may further include at least one diode connection transistor DCT instead of the light emitting element EL. Further, a sensing circuit 170 may include an integrator and an analog-to-digital converter ADC. A portion of a display device illustrated in FIG. 11 may have a similar configuration and a similar operation to a portion of a display device illustrated in FIG. 4, except that the test pixel TPXb may selectively couple a source node NS to a sensing line SL by using the fourth transistor T4 instead of a sixth transistor T6 illustrated in FIG. 4.

The first transistor T1 may include a top gate coupled to a gate node NG, a drain, a source coupled to the source node NS, and a bottom gate. The second transistor T2 may apply a data voltage of a data line DL1 and DL2 to the gate node NG in response to a writing signal GW. The third transistor T3 may apply a reference voltage VREF to the gate node NG in response to a reference signal GR. The fourth transistor T4 may include a gate for receiving an initialization signal GI_NPX and GI_TPX, a drain coupled to the source node NS, and a source for receiving an initialization voltage VINT. The fifth transistor T5 may couple a first power supply voltage line ELVDDL to the drain of the first transistor T1 in response to an emission signal EM. The storage capacitor CST may include a first electrode coupled to the gate node NG, and a second electrode coupled to the source node NS. The holding capacitor CHOLD may include a first electrode coupled to the first power supply voltage line ELVDDL, and a second electrode coupled to the source node NS and the bottom gate of the first transistor T1. The light emitting element EL of the normal pixel NPX may include an anode coupled to the source node NS, and a cathode coupled to a second power supply voltage line ELVSSL1. The diode connection transistor DCT of the test pixel TPXb may be coupled between the source node NS and a third power supply voltage line ELVSSL2. In some embodiments, as illustrated in FIG. 12, the test pixel TPXb' may include two or more diode connection transistors DCT1 and DCT2 between the source node NS and the third power supply voltage line ELVSSL2.

The sensing line SL may be coupled to the source of the fourth transistor T4 of the test pixel TPXb. In some embodiments, similarly to an initialization signal GI illustrated in FIG. 6, the initialization signal GI_NPX applied to the fourth transistor T4 of the normal pixel NPX may have a high level in an initialization period IP, and may have a low level in the remaining periods. However, the initialization signal GI_TPX applied to the fourth transistor T4 of the test pixel TPXb may have the high level not only in an initialization period IP but also in an emission period EP. Thus, the fourth transistor T4 of the test pixel TPXb may be turned off in response to the initialization signal GI_TPX having the low level in a data writing period WP to electrically separate the source node NS from the sensing line SL, and may be turned on in response to the initialization signal GI_TPX having the high level in the emission period EP to electrically couple the source node NS to the sensing line SL.

Hereinafter, an example of operations of the normal pixel NPX, the test pixel TPXb and the sensing circuit 170 will be described below with reference to FIGS. 11 and 13 through 15.

Figure 13:
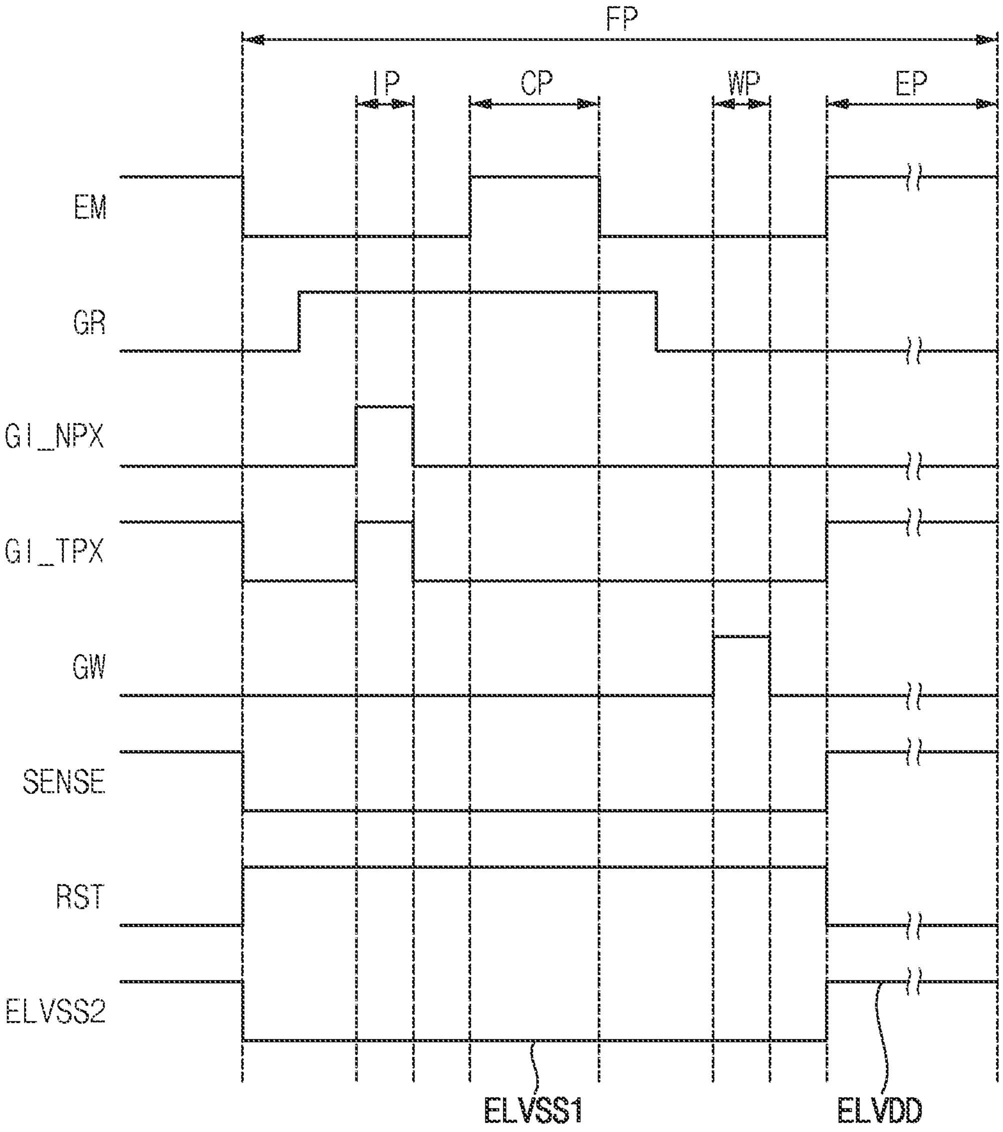
FIG. 13 is a timing diagram for describing an operation of a display device according to embodiments.
Figure 14:
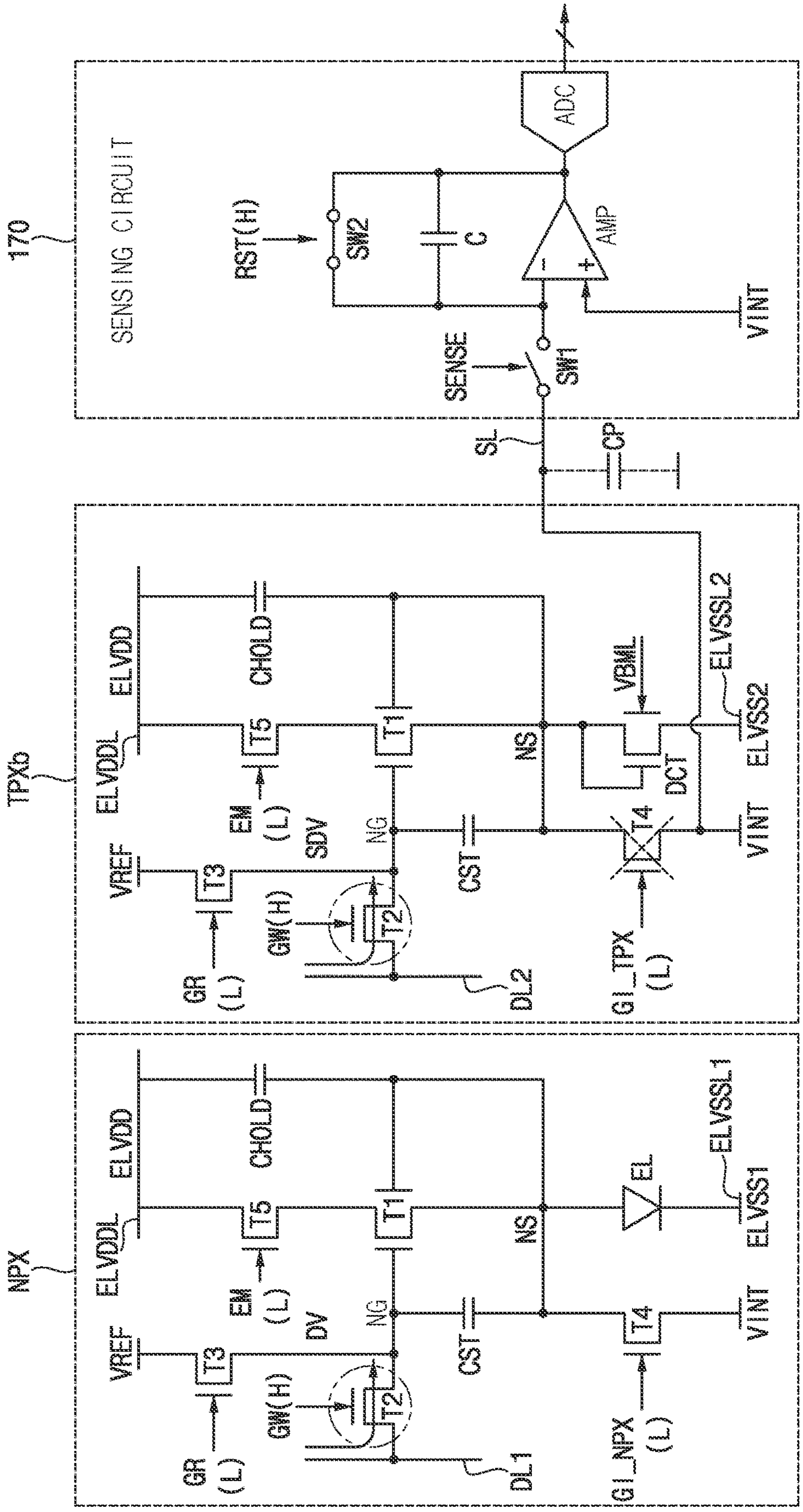
FIG. 14 is a circuit diagram for describing another example of operations of a normal pixel, a test pixel and a sensing circuit in a data writing period.
Figure 15:
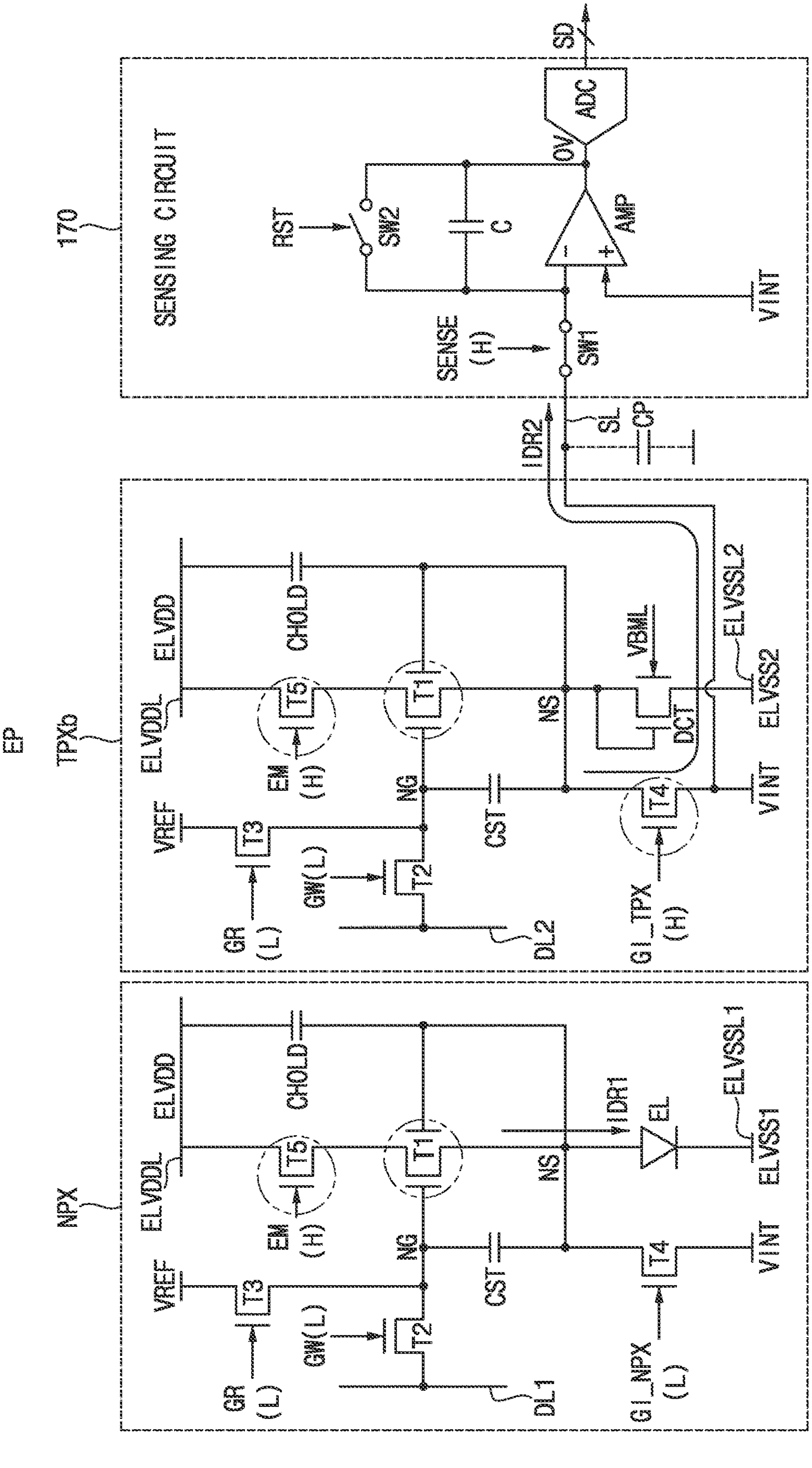
FIG. 15 is a circuit diagram for describing another example of operations of a normal pixel, a test pixel and a sensing circuit in an emission period.

FIG. 13 is a timing diagram for describing an operation of a display device according to embodiments, FIG. 14 is a circuit diagram for describing another example of operations of a normal pixel, a test pixel and a sensing circuit in a data writing period, and FIG. 15 is a circuit diagram for describing another example of operations of a normal pixel, a test pixel and a sensing circuit in an emission period.

Referring to FIGS. 11 and 13, a frame period FP for each pixel NPX and TPXb may include an initialization period IP, a compensation period CP, a data writing period WP and an emission period EP. A timing diagram of FIG. 11 may be substantially the same as a timing diagram of FIG. 6, except that the initialization signal GI_TPX for the test pixel TPXb may have a high level not only in the initialization period IP but also in the emission period EP.

In the initialization period IP, the gate node NG and the source node NS may be initialized. In the compensation period CP, a threshold voltage of the first transistor T1 may be compensated.

In the data writing period WP, the data voltage DV of the data line DL1 may be written to the pixel NPX and the sensing data voltage SDV of the data line DL2 may be written to the pixel TPXb. As illustrated in FIGS. 13 and 14, in the data writing period WP, the emission signal EM, the initialization signal GI_NPX and GI_TPX, the reference signal GR and the sensing signal SENSE have a low level L, the writing signal GW and the reset signal RST may have the high level H, and the third power supply voltage ELVSS2 may have a voltage level substantially the same as a voltage level of the second power supply voltage ELVSS1. The second transistor T2 may be turned on in response to the writing signal GW having the high level H to apply the data voltage DV of the data line DL1 and DL2 to the gate node NG. For example, the second transistor T2 of the normal pixel NPX may transfer the data voltage DV of a first data line DL1 corresponding to output image data, and the second transistor T2 of the test pixel TPXb may transfer, as the data voltage DV, a sensing data voltage SDV of a second data line DL2. Further, the fourth transistor T4 of the test pixel TPXb may be turned off in response to the initialization signal GI_TPX having the low level L to electrically separate the source node NS from the sensing line SL. Accordingly, a voltage stored between first and second electrodes of the storage capacitor CST of the test pixel TPXb may not be affected by a parasitic capacitor CP of the sensing line SL.

In the emission period EP, the light emitting element EL of the normal pixel NPX may emit light, and a mobility characteristic of the first transistor T1 of the test pixel TPXb may be sensed. As illustrated in FIGS. 13 and 15, in the emission period EP, the initialization signal GI_NPX for the normal pixel NPX, the reference signal GR, the writing signal GW and the reset signal RST may have the low level, the emission signal EM, the sensing signal SENSE and the initialization signal GI_TPX for the test pixel TPXb may have the high level H, and the third power supply voltage ELVSS2 may be increased from the second power supply voltage ELVSS1 to the first power supply voltage ELVDD. In the normal pixel NPX, the first transistor T1 may generate a current IDR1 based on a voltage stored in the storage capacitor CST, and the light emitting element EL may emit light based on the current IDR1 generated by the first transistor T1. In the test pixel TPXb, the fourth transistor T4 may be turned on in response to the initialization signal GI_TPX having the high level H to electrically couple the source node NS to the sensing line SL, and thus a current IDR2 generated by the first transistor T1 may be transferred to the sensing line SL through the source node NS and the fourth transistor T4. The integrator of the sensing circuit 170 may generate the output voltage OV by integrating the current IDR2 generated by the first transistor T1, and the analog-to-digital converter ADC of the sensing circuit 170 may generate the sensing data SD corresponding to the output voltage OV. In some embodiments, the sensing line SL may have the initialization voltage VINT in the emission period EP. Thus, in the emission period EP, although the sensing line SL is coupled to a line of the initialization voltage VINT, the current IDR2 generated by the first transistor T1 may be accurately measured.

As described above, the source node NS of the test pixel TPXb may be electrically separated by the fourth transistor T4 from the sensing line SL in the data writing period WP. Accordingly, as the data voltage DV, the sensing data voltage SDV of the test pixel TPXb may not be distorted by the parasitic capacitor CP of the sensing line SL, and the mobility characteristic change of the first transistor T1 may be accurately compensated.

Figure 16:
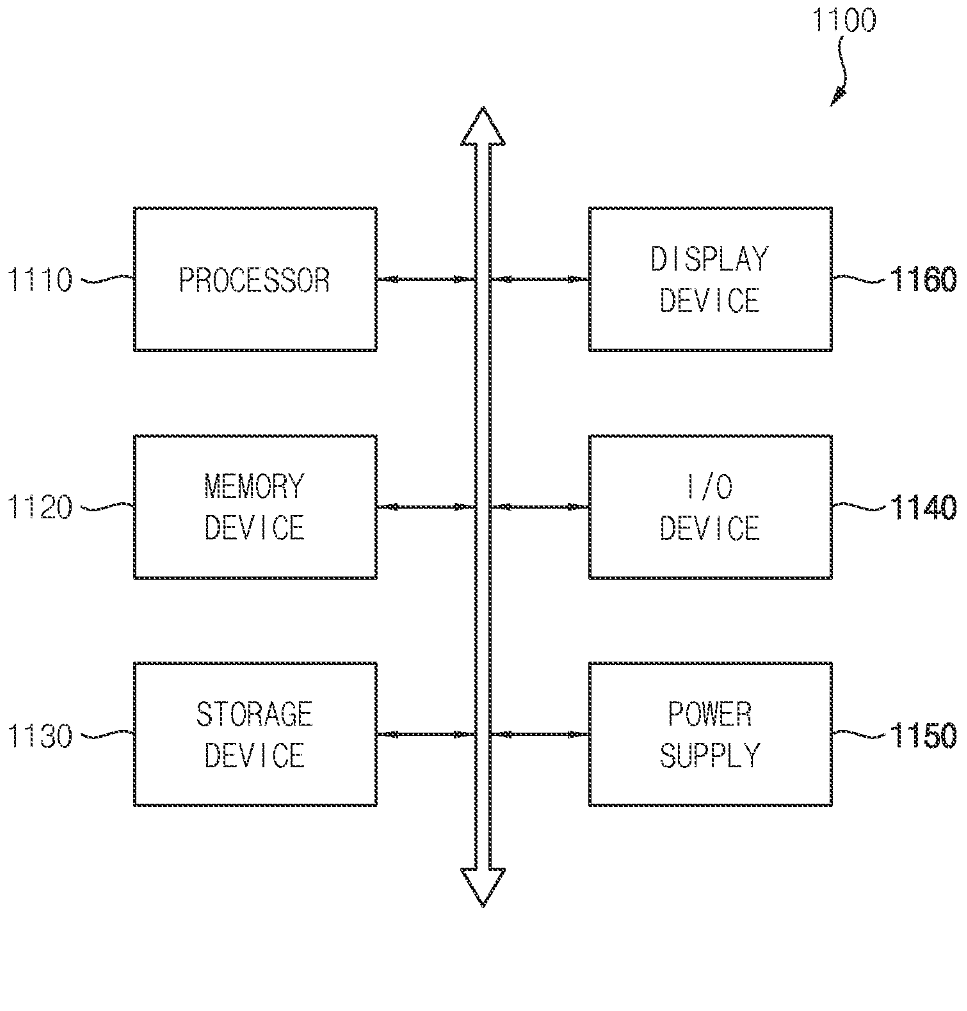
FIG. 16 is a block diagram illustrating an electronic device including a display device according to embodiments.

FIG. 16 is a block diagram illustrating an electronic device including a display device according to embodiments.

Referring to FIG. 16, an electronic device 1100 may include a processor 1110, a memory device 1120, a storage device 1130, an input/output ("I/O") device 1140, a power supply 1150, and a display device 1160. The electronic device 1100 may further include a plurality of ports for communicating with a video card, a sound card, a memory card, a universal serial bus ("USB") device, other electronic devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection ("PCI") bus.

The memory device 1120 may store data for operations of the electronic device 1100. For example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile dynamic random access memory (mobile DRAM) device, etc.

The storage device 1130 may be a solid state drive ("SSD") device, a hard disk drive ("HDD") device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, a display panel may include a test pixel coupled to a sensing line in a peripheral region, and a sensing circuit may sense a mobility characteristic of the test pixel by measuring a current at a source node of the test pixel through the sensing line. Accordingly, image data for a normal pixel may be corrected based on the mobility characteristic sensed using the test pixel, and thus a change in the mobility characteristic may be compensated. Further, the source node of the test pixel may be electrically separated from the sensing line in a data writing period, and may be electrically coupled to the sensing line in an emission period. Accordingly, a data voltage (or a sensing data voltage) of the test pixel may not be distorted by a parasitic capacitor of the sensing line.

The inventions may be applied to any electronic device 1100 including the display device 1160. For example, the inventions may be applied to a television ("TV"), a digital TV, a 3D TV, a smart phone, a wearable electronic device, a tablet computer, a mobile phone, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:

a display panel including a normal pixel in a display region and a test pixel in a peripheral region;

a sensing line coupled to the test pixel; and a sensing circuit configured to sense a mobility characteristic of the test pixel by measuring a current at a source node of the test pixel through the sensing line, wherein the source node of the test pixel is electrically separated from the sensing line in a data writing period of a frame period, and is electrically coupled to the sensing line in an emission period of the frame period, wherein the normal pixel includes a light emitting element, the test pixel includes a diode connection transistor instead of the light emitting element, and the diode connection transistor has a threshold voltage substantially the same as a threshold voltage of the light emitting element.

2. The display device of claim 1, wherein the normal pixel includes its own source node different from the source node of the test pixel, wherein each of the normal pixel and the test pixel includes:

a first transistor including a top gate coupled to a gate node, a drain, a source coupled to the source node, and a bottom gate;

a second transistor configured to apply a data voltage to the gate node in response to a writing signal;

a third transistor configured to apply a reference voltage to the gate node in response to a reference signal;

a fourth transistor configured to apply an initialization voltage to the source node in response to an initialization signal;

a fifth transistor configured to couple a first power supply voltage line to the drain of the first transistor in response to an emission signal;

a storage capacitor including a first electrode coupled to the gate node, and a second electrode coupled to the source node; and a holding capacitor including a first electrode coupled to the first power supply voltage line, and a second electrode coupled to the source node and the bottom gate of the first transistor, wherein the normal pixel further includes:

a light emitting element including an anode coupled to the source node, and a cathode coupled to a second power supply voltage line, and wherein the test pixel further includes:

at least one diode connection transistor coupled between the source node and a third power supply voltage line; and a sixth transistor configured to couple the source node to the sensing line in response to a sensing signal.

3. The display device of claim 2, wherein a third power supply voltage of the third power supply voltage line has a voltage level substantially the same as a voltage level of a second power supply voltage of the second power supply voltage line in a non-emission period including the data writing period, and has a voltage level substantially the same as a voltage level of a first power supply voltage of the first power supply voltage line in the emission period.

4. The display device of claim 2, wherein the at least one diode connection transistor includes a top gate coupled to the source node, a drain coupled to the source node, and a source coupled to the third power supply voltage line.

5. The display device of claim 4, wherein the at least one diode connection transistor further includes a bottom gate for receiving a bottom gate voltage.

6. The display device of claim 2, wherein the sixth transistor includes a gate for receiving the sensing signal, a drain coupled to the source node, and a source coupled to the sensing line.

7. The display device of claim 2, wherein the first through sixth transistors are implemented with n-type metal oxide semiconductor (NMOS) transistors.

8. The display device of claim 2, wherein the frame period includes:

an initialization period in which the gate node and the source node are initialized;

a compensation period in which a threshold voltage of the first transistor is compensated;

the data writing period in which the data voltage is written to the gate node; and the emission period in which the light emitting element of the normal pixel emits light, and the mobility characteristic of the first transistor of the test pixel is sensed.

9. The display device of claim 8, wherein, in the initialization period, the emission signal, the writing signal and the sensing signal have a low level, the initialization signal and the reference signal have a high level, the third transistor is turned on in response to the reference signal having the high level to apply the reference voltage to the gate node, and the fourth transistor is turned on in response to the initialization signal having the high level to apply the initialization voltage to the source node.

10. The display device of claim 8, wherein, in the compensation period, the initialization signal, the writing signal and the sensing signal have a low level, the emission signal and the reference signal have a high level, the third transistor is turned on in response to the reference signal having the high level to apply the reference voltage to the gate node, the fifth transistor is turned on in response to the emission signal having the high level, and a voltage of the source node is saturated to a voltage corresponding to a value obtained by subtracting the threshold voltage of the first transistor from the reference voltage.

11. The display device of claim 8, wherein, in the data writing period, the emission signal, the initialization signal, the reference signal and the sensing signal have a low level, the writing signal has a high level, the second transistor is turned on in response to the writing signal having the high level to apply the data voltage to the gate node, and the sixth transistor of the test pixel is turned off in response to the sensing signal having the low level to electrically separate the source node of the test pixel from the sensing line.

12. The display device of claim 8, wherein, in the emission period, the initialization signal, the reference signal and the writing signal have a low level, the emission signal and the sensing signal have a high level, in the normal pixel, the light emitting element emits light based on a current generated by the first transistor, and in the test pixel, the sixth transistor is turned on in response to the sensing signal having the high level to electrically couple the source node to the sensing line such that a current generated by the first transistor is transferred to the sensing line through the source node and the sixth transistor.

13. The display device of claim 1, wherein the normal pixel includes its own source node different from the source node of the test pixel, wherein each of the normal pixel and the test pixel includes:

a first transistor including a top gate coupled to a gate node, a drain, a source coupled to the source node, and a bottom gate;

a second transistor configured to apply a data voltage to the gate node in response to a writing signal;

a third transistor configured to apply a reference voltage to the gate node in response to a reference signal;

a fourth transistor including a gate for receiving an initialization signal, a drain coupled to the source node, and a source for receiving an initialization voltage;

a fifth transistor configured to couple a first power supply voltage line to the drain of the first transistor in response to an emission signal;

a storage capacitor including a first electrode coupled to the gate node, and a second electrode coupled to the source node; and a holding capacitor including a first electrode coupled to the first power supply voltage line, and a second electrode coupled to the source node and the bottom gate of the first transistor, wherein the normal pixel further includes:

a light emitting element including an anode coupled to the source node, and a cathode coupled to a second power supply voltage line, wherein the test pixel further includes:

at least one diode connection transistor coupled between the source node and a third power supply voltage line, and wherein the sensing line is coupled to the source of the fourth transistor of the test pixel.

14. The display device of claim 13, wherein, in the data writing period, the emission signal, the initialization signal and the reference signal have a low level, the writing signal has a high level, the second transistor is turned on in response to the writing signal having the high level to apply the data voltage to the gate node, and the fourth transistor of the test pixel is turned off in response to the initialization signal having the low level to electrically separate the source node of the test pixel from the sensing line.

15. The display device of claim 13, wherein, in the emission period, the reference signal and the writing signal have a low level, the emission signal has a high level, the initialization signal for the normal pixel has the low level, the initialization signal for the test pixel has the high level, in the normal pixel, the light emitting element emits light based on a current generated by the first transistor, and in the test pixel, the fourth transistor is turned on in response to the initialization signal having the high level to electrically couple the source node to the sensing line such that a current generated by the first transistor is transferred to the sensing line through the source node and the fourth transistor.

16. The display device of claim 1, wherein the sensing circuit includes:

an integrator configured to generate an output voltage by integrating a current transferred through the sensing line; and an analog-to-digital converter configured to generate sensing data by performing an analog-to-digital conversion operation on the output voltage of the integrator.

17. The display device of claim 16, wherein the integrator includes:

an amplifier including a first input terminal, a second input terminal, and an output terminal for outputting the output voltage;

a first switch configured to couple the sensing line to the first input terminal of the amplifier in response to a sensing signal;

a second switch configured to couple the first input terminal of the amplifier to the output terminal of the amplifier in response to a reset signal; and a capacitor coupled between the first input terminal of the amplifier and the output terminal of the amplifier.

18. The display device of claim 1, further comprising:

a data driver configured to provide data voltages to the normal pixel and the test pixel;

a scan driver configured to provide scan signals to the normal pixel and the test pixel;

an emission driver configured to provide emission signals to the normal pixel and the test pixel; and a controller configured to control the data driver, the scan driver and the emission driver, wherein the controller receives sensing data representing the mobility characteristic of the test pixel from the sensing circuit, and corrects image data for the normal pixel based on the sensing data.

19. A display device comprising:

a display panel including a normal pixel in a display region and a test pixel in a peripheral region;

a sensing line coupled to the test pixel; and a sensing circuit configured to sense a mobility characteristic of the test pixel through the sensing line, wherein each of the normal pixel and the test pixel includes:

a first transistor including a top gate coupled to a gate node, a drain, a source coupled to a source node, and a bottom gate;

a second transistor configured to apply a data voltage to the gate node in response to a writing signal;

a third transistor configured to apply a reference voltage to the gate node in response to a reference signal;

a fourth transistor configured to apply an initialization voltage to the source node in response to an initialization signal;

a fifth transistor configured to couple a first power supply voltage line to the drain of the first transistor in response to an emission signal;

a storage capacitor including a first electrode coupled to the gate node, and a second electrode coupled to the source node; and a holding capacitor including a first electrode coupled to the first power supply voltage line, and a second electrode coupled to the source node and the bottom gate of the first transistor, wherein the normal pixel further includes:

a light emitting element including an anode coupled to the source node, and a cathode coupled to a second power supply voltage line, and wherein the test pixel further includes:

at least one diode connection transistor coupled between the source node and a third power supply voltage line; and a sixth transistor configured to couple the source node to the sensing line in response to a sensing signal.

20. The display device of claim 19, wherein, in a data writing period of a frame period, the sixth transistor of the test pixel is turned off in response to the sensing signal having a low level to electrically separate the source node of the test pixel from the sensing line, and wherein, in an emission period of the frame period, the sixth transistor of the test pixel is turned on in response to the sensing signal having a high level to electrically couple the source node to the sensing line such that a current generated by the first transistor of the test pixel is transferred to the sensing line through the source node of the test pixel and the sixth transistor of the test pixel.

21. A display device comprising:

a display panel including a normal pixel in a display region and a test pixel in a peripheral region;

a sensing line coupled to the test pixel; and a sensing circuit configured to sense a mobility characteristic of the test pixel through the sensing line, wherein each of the normal pixel and the test pixel includes:

a first transistor including a top gate coupled to a gate node, a drain, a source coupled to a source node, and a bottom gate;

a second transistor configured to apply a data voltage to the gate node in response to a writing signal;

a third transistor configured to apply a reference voltage to the gate node in response to a reference signal;

a fourth transistor including a gate for receiving an initialization signal, a drain coupled to the source node, and a source for receiving an initialization voltage;

a fifth transistor configured to couple a first power supply voltage line to the drain of the first transistor in response to an emission signal;

a storage capacitor including a first electrode coupled to the gate node, and a second electrode coupled to the source node; and a holding capacitor including a first electrode coupled to the first power supply voltage line, and a second electrode coupled to the source node and the bottom gate of the first transistor, wherein the normal pixel further includes:

a light emitting element including an anode coupled to the source node, and a cathode coupled to a second power supply voltage line, wherein the test pixel further includes:

at least one diode connection transistor coupled between the source node and a third power supply voltage line, and wherein the sensing line is coupled to the source of the fourth transistor of the test pixel.

22. The display device of claim 21, wherein, in a data writing period of a frame period, the fourth transistor of the test pixel is turned off in response to the initialization signal having a low level to electrically separate the source node of the test pixel from the sensing line, and wherein, in an emission period of the frame period, the fourth transistor of the test pixel is turned on in response to the initialization signal having a high level to electrically couple the source node to the sensing line such that a current generated by the first transistor of the test pixel is transferred to the sensing line through the source node of the test pixel and the fourth transistor of the test pixel.

* * * * *